(12) United States Patent
Damnjanovic et al.

(10) Patent No.: US 11,582,832 B2
(45) Date of Patent: Feb. 14, 2023

(54) ACTIVATION/DEACTIVATION OF DIRECT LINK IN DUAL/MULTI-CONNECTIVITY WITH UE RELAYS

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/195,609

(22) Filed: Mar. 8, 2021

(65) Prior Publication Data

US 2022/0287145 A1   Sep. 8, 2022

(51) Int. Cl.
*H04W 76/30* (2018.01)
*H04L 69/323* (2022.01)
*H04L 69/324* (2022.01)
*H04W 16/26* (2009.01)

(52) U.S. Cl.
CPC .......... *H04W 76/30* (2018.02); *H04L 69/323* (2013.01); *H04L 69/324* (2013.01); *H04W 16/26* (2013.01)

(58) Field of Classification Search
None
See application file for complete search history.

(56) References Cited

U.S. PATENT DOCUMENTS

| 2020/0037398 | A1 | 1/2020 | Adachi et al. | |
| 2021/0153063 | A1* | 5/2021 | Zhang | H04L 45/24 |
| 2021/0289580 | A1* | 9/2021 | Damnjanovic | H04W 76/27 |
| 2021/0377842 | A1* | 12/2021 | Xu | H04W 76/14 |
| 2022/0046485 | A1* | 2/2022 | Hong | H04W 36/0009 |
| 2022/0046753 | A1* | 2/2022 | Ryu | H04W 80/02 |

FOREIGN PATENT DOCUMENTS

WO   WO-2021204368 A1 * 10/2021

OTHER PUBLICATIONS

International Search Report and Written Opinion—PCT/US2022/011658—ISA/EPO—dated Apr. 22, 2022.

* cited by examiner

*Primary Examiner* — Anh Vu H Ly
(74) *Attorney, Agent, or Firm* — Procopio, Cory, Hargreaves & Savitch LLP

(57) ABSTRACT

A configuration utilising L1/L2 signaling to activate or deactivate a direct link in dual or multi-connectivity with relaying devices. The apparatus communicates with a base station using a direct link and using a relay link. The relay link comprises a side link between a first UE and a second UE and a second direct link between the second UE and the base station. The apparatus transmits or receives a request to deactivate the direct link based on a determination by at least one of the base station, the first UE, or the second UE that the direct link between the first UE and the base station is to be deactivated. The request to deactivate the direct link comprises L1 or L2 signaling. The apparatus receives a deactivation command to deactivate the direct link.

30 Claims, 12 Drawing Sheets

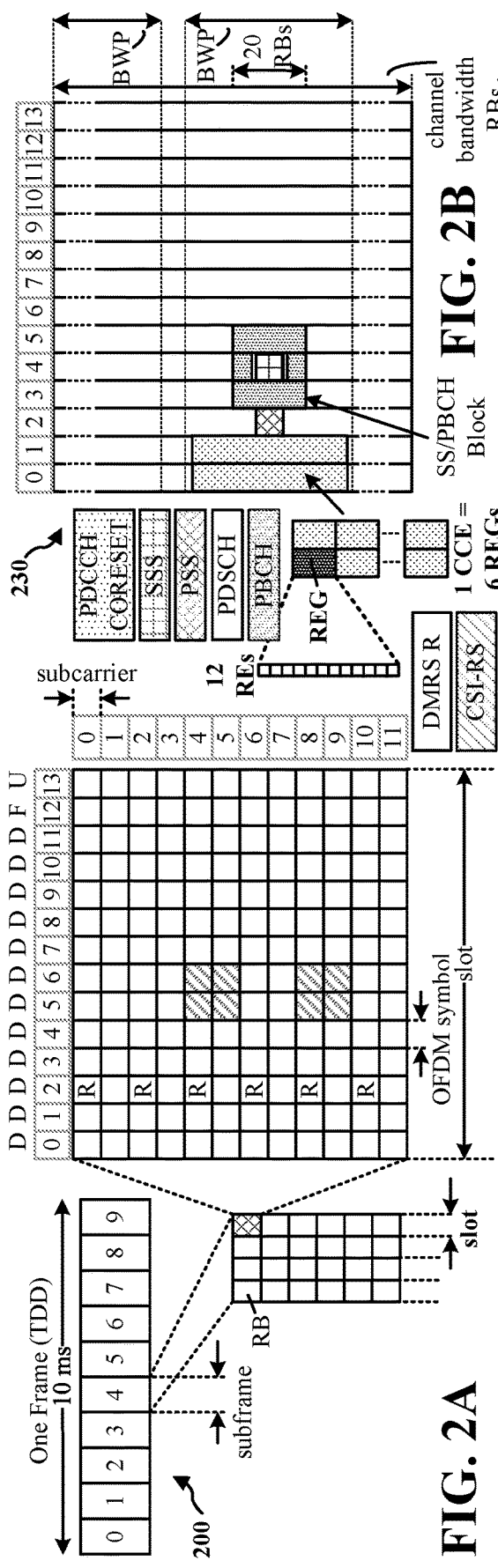
FIG. 2A
FIG. 2B
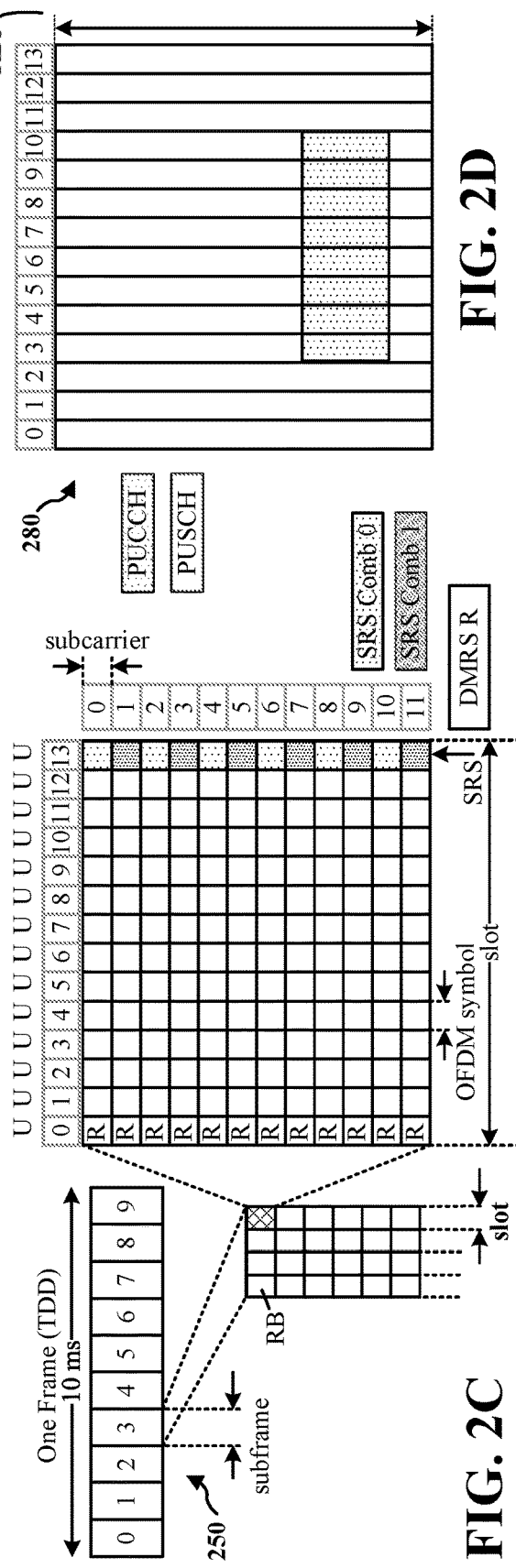
FIG. 2C
FIG. 2D

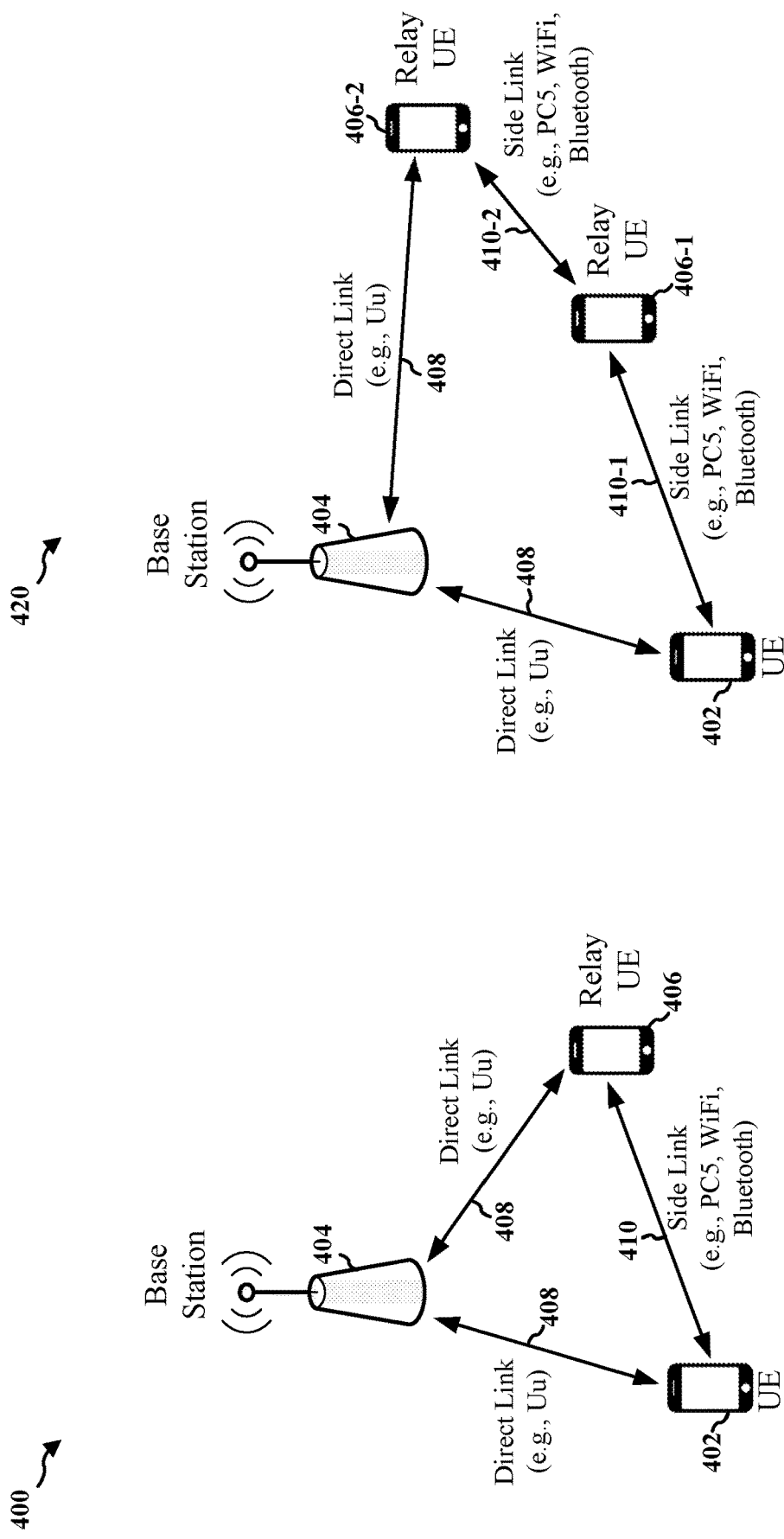

ACTIVATION/DEACTIVATION OF DIRECT LINK IN DUAL/MULTI-CONNECTIVITY WITH UE RELAYS

BACKGROUND

Technical Field

The present disclosure relates generally to communication systems, and more particularly, to a configuration utilising L1/L2 signaling to activate or deactivate a direct link in dual or multi-connectivity with relaying devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus communicates with a base station using a direct link and using a relay link. The relay link comprises a side link between the first UE and a second UE and a second direct link between the second UE and the base station. The apparatus transmits or receives a request to deactivate the direct link based on a determination by at least one of the base station, the first UE, or the second UE that the direct link between the first UE and the base station is to be deactivated. The request to deactivate the direct link comprises layer 1 (L1) or layer 2 (L2) signaling. The apparatus receives a deactivation command to deactivate the direct link.

In an aspect of the disclosure, a method, a computer-readable medium, and an apparatus are provided. The apparatus may be a device at a UE. The device may be a processor and/or a modem at a UE or the UE itself. The apparatus communicates with a base station using a second direct link and a first UE using a relay link. The relay link comprises a side link between the first UE and the second UE and the second direct link between the second UE and the base station. The apparatus receives a request to deactivate a first direct link between the first UE and the base station. The request to deactivate the first direct link comprises layer 1 (L1) or layer 2 (L2) signaling. The apparatus relays, to the first UE or the base station, the request to deactivate the first direct link between the base station and the first UE. The apparatus relays, to the first UE, a deactivation command to deactivate the first direct link.

In an aspect of the disclosure, a method, a computer-readable medium, and an apparatus are provided. The apparatus may be a device at a base station. The device may be a processor and/or a modem at a base station or the base station itself. The apparatus communicates with a first user equipment (UE) using a first direct link and using a relay link. The relay link comprises a side link between the first UE and a second UE and a second direct link between the second UE and the base station. The apparatus transmits or receives a request to deactivate the first direct link, based on a determination by at least one of the base station, the first UE, or the second UE that the first direct link is to be deactivated. The request to deactivate the first direct link comprises layer 1 (L1) or layer 2 (L2) signaling. The apparatus transmitting a deactivation command to deactivate the first direct link.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A-4B are diagrams illustrating a base station, a UE, and a relay UE in a wireless communication system.

DETAILED DESCRIPTION

Figure 1:
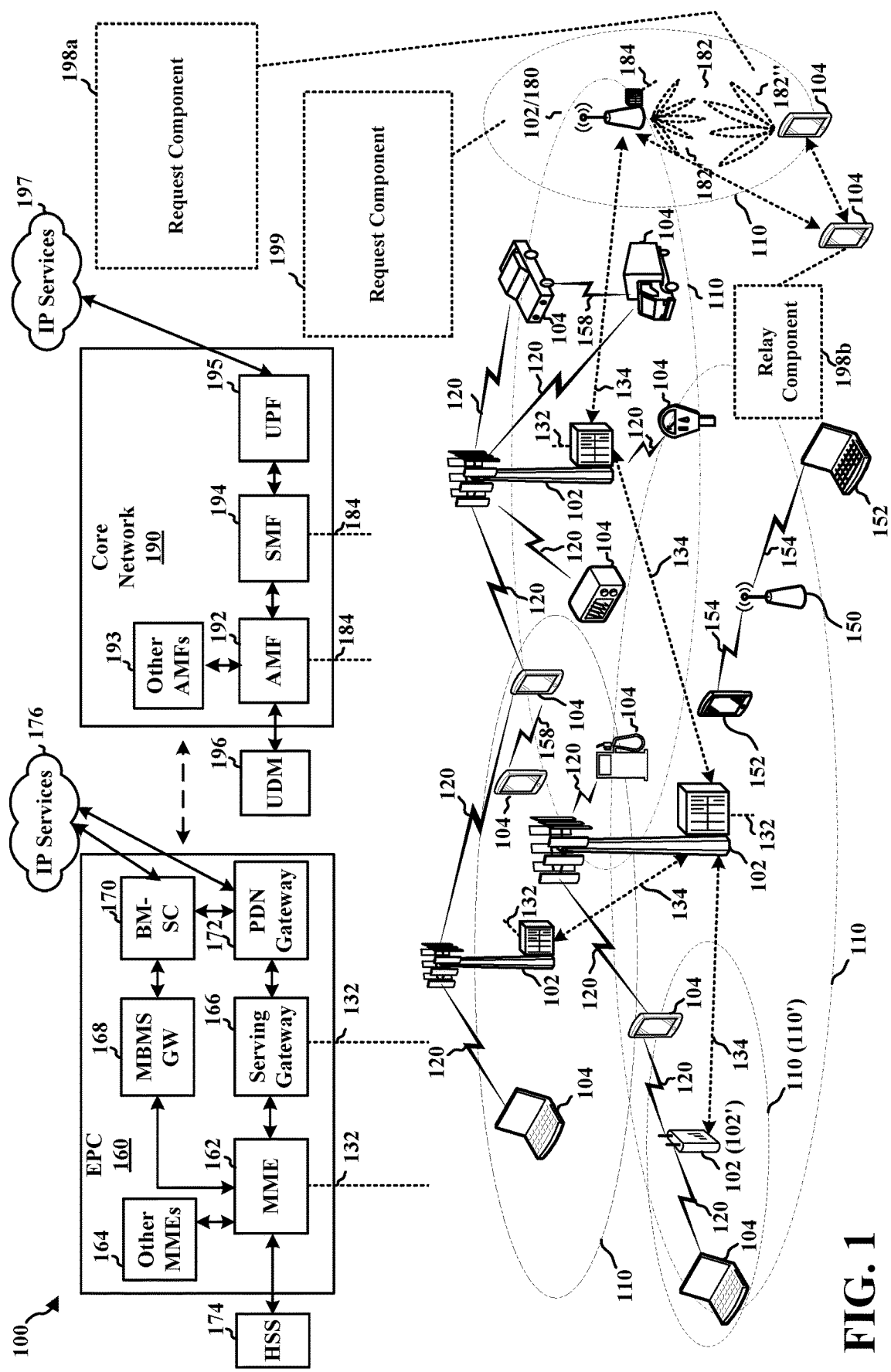
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the first UE 104 may be configured to activate or deactivate a direct link with a base station using L1 or L2 signaling. For example, the first UE may comprise a request component 198a configured to activate or deactivate a direct link with a base station using L1 or L2 signaling. The first UE communicates with a base station using a direct link and using a relay link. The relay link comprises a side link between the first UE and a second UE and a second direct link between the second UE and the base station. The first UE 104 may transmit or receive a request to deactivate the direct link based on a determination by at least one of the base station, the first UE, or the second UE that the direct link between the first UE and the base station is to be deactivated. The request to deactivate the direct link comprises L1 or L2 signaling. The first UE 104 may receive a deactivation command to deactivate the direct link.

Referring again to FIG. 1, in certain aspects, the second UE 104 may be configured to assist in the activation or deactivation of a direct link between a first UE and a base station using L1 or L2 signaling. For example, the second UE 104 may comprise a relay component 198b configured to assist in the activation or deactivation of a direct link between a first UE and a base station using L1 or L2 signaling. The second UE 104 may communicate with a base station using a second direct link and a first UE using a relay link. The relay link comprises a side link between the first UE and the second UE and the second direct link between the second UE and the base station. The second UE 104 may receive a request to deactivate a first direct link between the first UE and the base station. The request to deactivate the first direct link comprises L1 or L2 signaling. The second UE 104 may relay, to the first UE or the base station, the request to deactivate the first direct link between the base station and the first UE. The second UE 104 may relay, to the first UE, a deactivation command to deactivate the first direct link.

In certain aspects, the base station 180 may be configured to activate or deactivate a direct link with a first UE using L1 or L2 signaling. For example, the base station may comprise a request component 199 configured to activate or deactivate a direct link with a first UE using L1 or L2 signaling. The base station 180 may communicate with a first UE using a first direct link and using a relay link. The relay link comprises a side link between the first UE and a second UE and a second direct link between the second UE and the base station. The base station 180 may transmit or receive a request to deactivate the first direct link, based on a determination by at least one of the base station, the first UE, or the second UE that the first direct link is to be deactivated. The request to deactivate the first direct link comprises L1 or L2 signaling. The base station 180 may transmit a deactivation command to deactivate the first direct link.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
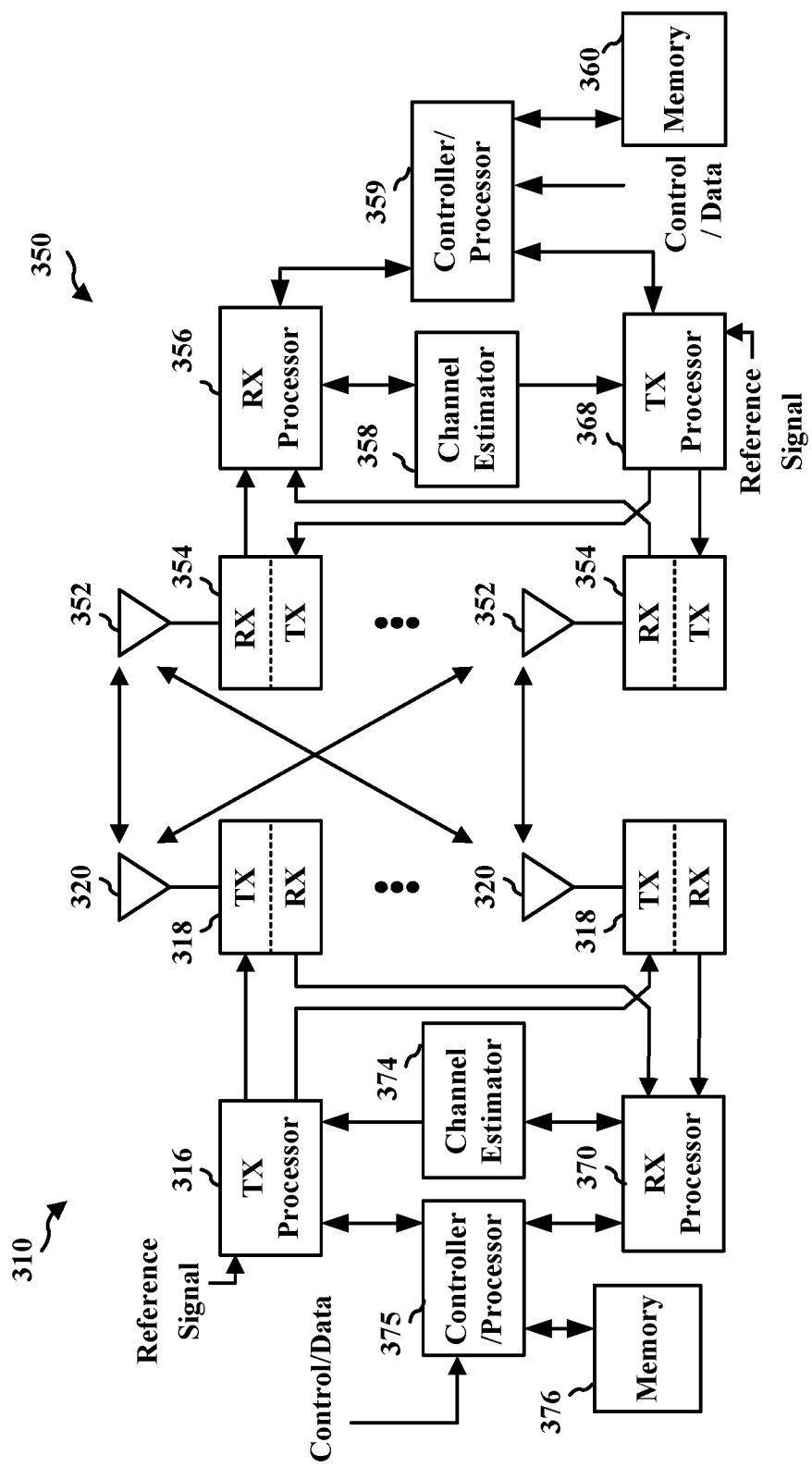
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198*a* or 198*b* of FIG. 1.

At least one of the TX processor 316, the RX processor 370, and the controller/processor 375 may be configured to perform aspects in connection with 199 of FIG. 1.

In higher frequency band operation (e.g., frequency range 2 (FR2)), the direct link between a UE and a serving base station may be impaired or block frequently, serving data rate and/or throughput may not be sufficient, or there may be a need for traffic offloading. In some instances, these issues may be addressed by providing link diversity, such as selection or aggregation. The link diversity may also provide coverage enhancements and power consumption reductions that may be especially desirable in FR2 operation. A relay UE may be utilized to provide diversity and/or coverage enhancements as well as a reduction in power consumption.

To facilitate more dynamic relaying function, RRC may configure or setup a direct link to the base station and one or more relaying links, while L1/L2 signaling may be used to activate and/or deactivate the direct link when conditions are such that only relaying link(s) should be used for data and/or control communication.

FIGS. 4A-4B are diagrams 400, 420 illustrating a base station, a UE, and a relay UE in a wireless communication system. Diagrams 400 and 420 are examples of dual connectivity configuration, where the UE 402 and the base station 404 communicate with two different nodes. With reference to FIG. 4A, the UE 402 may communicate with the relay UE 406 and the base station 404, while the base station 404 may communicate with the relay UE 406 and the UE 402. The UE 402 and the base station 404 may have two simultaneous PHY-to-RLC stacks for Uu link (e.g., direct link 408) and sidelink 410 and common packet data convergence protocol (PDCP). The base station 404 may commonly serve the UE 402 and the relay UE 406. The UE 402 and the relay UE 406 may communicate using two links. For example, the UE 402 and the relay UE 406 may each have a Uu link (e.g., direct link 408) with the base station 404, while have a sidelink 410 between each other. The sidelink 410 may be based on PC5 interface, WiFi, Bluetooth, or the like. With reference to FIG. 4B, the relay UE may comprise of a plurality of relay UEs (e.g., 406-1, 406-2), wherein each of the plurality of relay UEs (e.g., 406-1, 406-2) have a sidelink (e.g., 410-2) with each other. At least one of the plurality of relay UEs (e.g., 406-2) may have a direct link 408 with the base station 404, while at least another one of the plurality of relay UEs (e.g., 406-1) has a sidelink (e.g., 410-1) with the UE 402, such that the UE 402 and the base station 404 may communicate with each other over the relay link comprised of the plurality of relay UEs (e.g., 406-1, 406-2). In addition to considering the case of the UE 402 and the relay UEs 406-1, 406-2 being independent wireless devices, the UE and/or the relay UEs may be a combination of related devices, such as but not limited to a smart watch, laptop, smart glasses, phone, etc. Fast link selection and/or aggregation may be facilitated by providing the control from the serving base station 404. L2 relay UE 406 may be an option as a base line. In some instances, the plurality of relay UEs may comprise N relay UEs, wherein a first relay UE has a sidelink with the UE 402, the Nth relay UE has a direct link with the base station, wherein the N relay UEs have a sidelink with each other to form the relay link between the UE 402 and the base station 404.

Figure 5B:
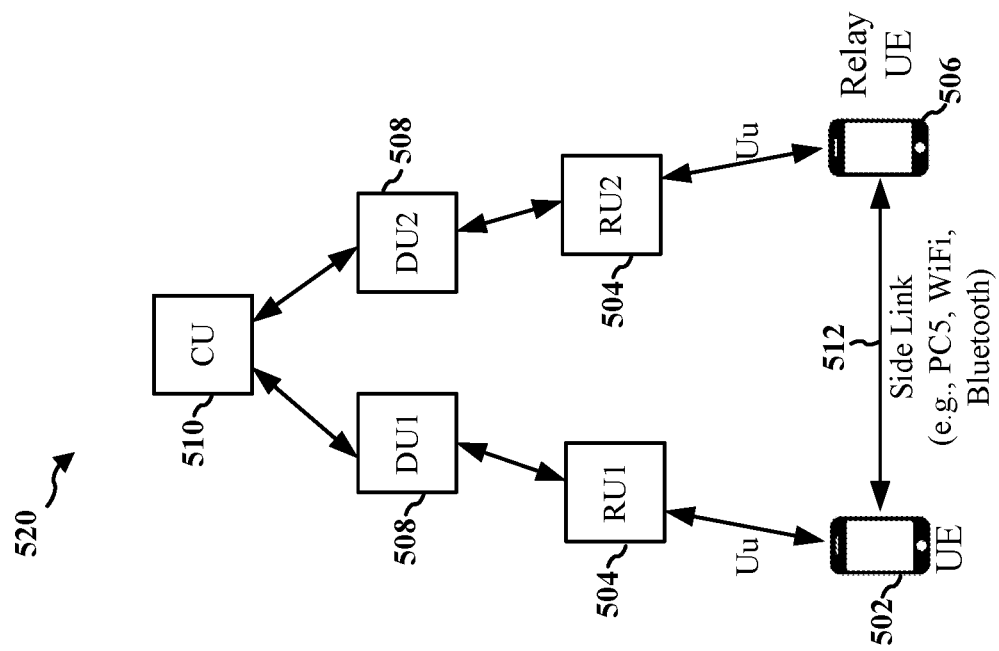
FIGS. 5A-5B are diagrams illustrating a UE and a relay UE in a wireless communication system.
Figure 5A:
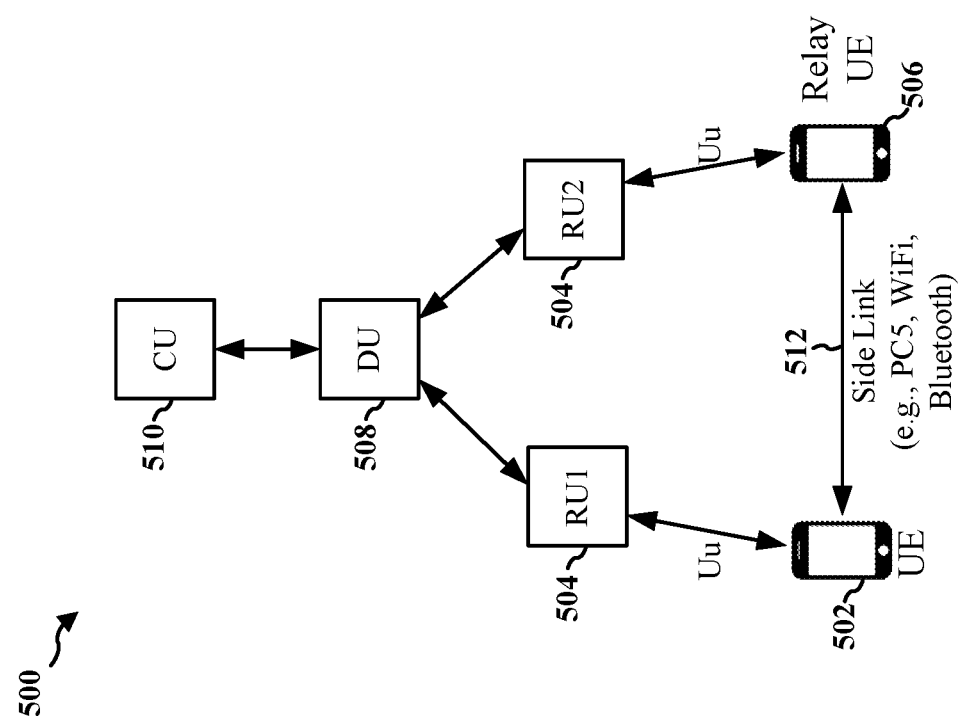

FIGS. 5A-5B are diagrams 500, 520 illustrating a UE and a relay UE in a wireless communication system. Diagrams 500 and 520 are examples of dual connectivity having a split distributed unit (DU), radio unit (RU), or control unit (CU). The UE 502 and relay UE 506 may be served by different RUs (e.g., RU1 504 and RU2 504). In diagram 500 of FIG. 5A, the RUs 504 share the same DU 508 and CU 510. In diagram 520 of FIG. 5B, the UE 502 and relay UE 506 may be served by different RUs (e.g., RU1 504, RU2 504), where the RUs are linked to different DUs (e.g., DU1 508, DU2 508), and share the same CU 510. The UE 502 and relay UE 506 may communicate using multiple links. For example, the UE 502 and relay UE 506 may communicate with a serving base station using a respective direct link (e.g., Uu), while sidelinks 512 may be between the UE 502 and the relay UE 506. Sidelinks 512 may be based on one type or a combination of different types e.g., PC5, WiFi, Bluetooth, etc.

Aspects provided herein provide a configuration utilising L1/L2 signaling to activate or deactivate a direct link in dual or multi-connectivity with relaying device. For example, a first UE may be configured to transmit or receive a request to deactivate a direct link between the first UE and a base station, where the request to deactivate the direct link comprises L1 or L2 signaling. The first UE may transmit or receive the request to deactivate the direct link over a direct link between the first UE and the base station. The first UE may transmit or receive the request over a relay link with the second UE, wherein the relay link comprises a sidelink between the first UE and the second UE, and a direct link between the second UE and the base station, such that the first UE transmits or receives the request for deactivation over the relay link. The base station may be configured to transmit or receive a request to deactivate a direct link between the first UE and the base station, where the request to deactivate the direct link comprises L1 or L2 signaling. The base station may transmit or receive the request to deactivate the direct link over a direct link between the first UE and the base station. The base station may transmit or receive the request over a relay link with the second UE, wherein the relay link comprises a sidelink between the first UE and the second UE, and a direct link between the second UE and the base station, such that the base station transmits or receives the request for deactivation over the relay link.

Figure 6:
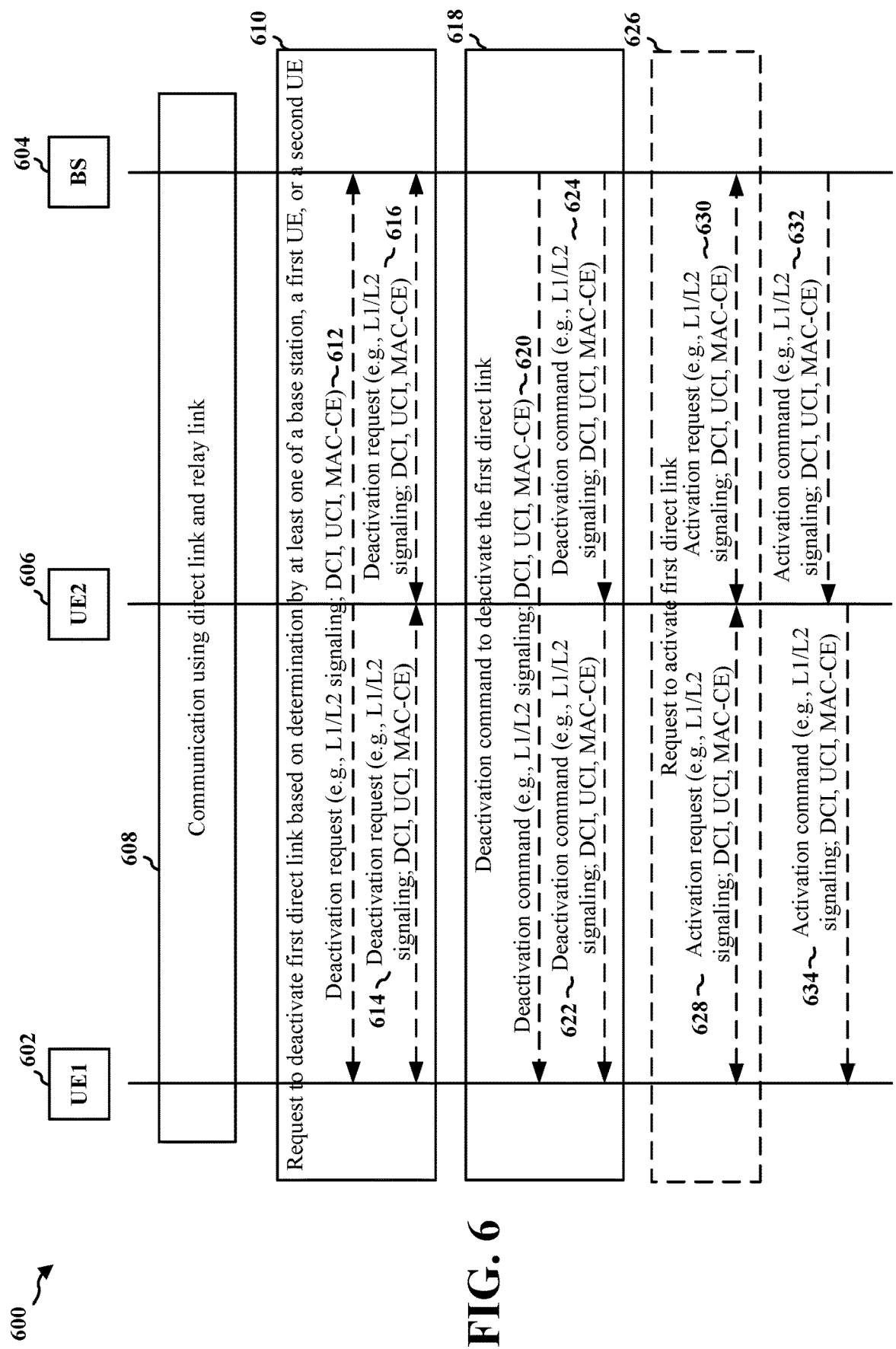
FIG. 6 is a call flow diagram of signaling between a first UE, a second UE, and a base station in accordance with certain aspects of the disclosure.

FIG. 6 is a call flow diagram 600 of signaling between a UE 602 and a base station 604. The base station 604 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350. Optional aspects are illustrated with a dashed line.

As illustrated at 608, the first UE 602 may communicate with the base station 604 using a direct link and using a relay link. The second UE 606 may communicate with the first UE 602 using a sidelink and may communicate with the base station 604 using a second direct link with the base station 604. The relay link may comprise the sidelink between the first UE and the second UE and the second direct link between the second UE and the base station. The second UE may comprise a relay UE. The first UE may have multiple active links. For example, the first UE may have a direct link with the base station and may have an active sidelink with the second UE, wherein the second UE is a relay UE and relays communication between the base station and the first UE using the relay link. In some aspects, the second UE may comprise a plurality of relay UEs, such that each of the plurality of relay UEs relays data between the first UE and the base station. The plurality of relay UEs relay data between each other and the first UE using a sidelink, while at least one of the plurality of relay UFs relays data to and from the base station using a second direct link between the base station and the at least one of the plurality of relay UEs.

As illustrated at 610, the first UE 602 or the base station 604 may transmit or receive a request to deactivate the direct link. The first UE or the base station 604 may transmit or receive the request to deactivate the direct link based on a determination by at least one of the base station, the first UE, or the second UE that the direct link between the first UE and the base station is to be deactivated. The request to deactivate the direct link may comprise L1 or L2 signaling. For example, the L1 signaling may comprise DCI or UCI, while the L2 signaling may comprise medium access control (MAC) control element (CE) (MAC-CE). In some aspects, the direct link between the first UE and the base station may be determined to be deactivated based on at least one of a reduction of quality of service of the direct link, a signal quality of the direct link falling below a threshold, the relay link providing requested service requirements, or a power savings requirement at the first UE. For example, the reduction of the quality of service of the direct link may be determined based at least on a detection of problems with the direct link, such as but not limited to, excessive delays or deterioration of the link. In some aspects, the quality of service of the direct link may become worse than another available relay link or may become worse such that the quality of service falls below a threshold. In such instances, the direct link may be exchanged for a relaying link that has a higher quality of service than the direct link. In some aspects, the relay link may provide requested service requirements based on data needs and channel quality. In some aspects, the first UE may encounter power savings requirements due in part to low power availability at the first UE that may not support or allow for multiple active links, such that the direct link may be deactivated in an effort to reduce power consumption at the first UE while maintaining communication with the base station using the relay link with the second UE.

In some aspects, the first UE may transmit the deactivation request 612 to deactivate the direct link to the base station. The first UE may transmit the request to deactivate the direct link to the base station using the direct link or the relay link. For example, the first UE may transmit the request to deactivate the direct link using the direct link, such that the request is originated at the first UE and transmitted to the base station over the direct link. In some aspects, the first UE may transmit the request using the relay link. For example, the first UE may transmit the deactivation request 614 to deactivate the direct link to the second UE using the sidelink. The second UE relays the deactivation request 616 to deactivate the direct link from the first UE to the base station using the relay link, such that the request is received by the second UE and is relayed to the base station over a second direct link between the second UE and the base station. In some aspects, the base station may transmit or receive the deactivation request 612 to deactivate the first direct link. The base station may transmit or receive the deactivation request to deactivate the first direct link based on a determination by at least one of the base station, the first UE, or the second UE that the first direct link between the first UE and the base station is to be deactivated. The base station may receive, from the first UE or the second UE, the request to deactivate the first direct link using the first direct link or the relay link. For example, the request to deactivate the first direct link may be received from the first UE using the direct link. For example, the base station 604 may receive the deactivation request 612 from the first UE 602. In some aspects, the request to deactivate the first direct link may be received from the second UE using the relay link. For example, the first UE may transmit the request to deactivate the first direct link to the second UE using the sidelink. The second UE relays the request to deactivate the first direct link from the first UE to the base station using the relay link, such that the request is received by the second UE and is relayed to the base station over the second direct link between the second UE and the base station. For example, the first UE 602 transmits the deactivation request 614 to the second UE 606, and the second UE 606 relays the deactivation request 616 to the base station 604 using the second direct link between the second UE 606 and the base station 604. In some aspects, the base station 604 may transmit the deactivation request 612 to the first UE 602. In some aspects, the base station may transmit the deactivation request to deactivate the first direct link to the second UE using the relay link. For example, the base station 604 transmits the deactivation request 616 to the second UE 606, and the second UE 606 relays the deactivation request 614 to the first UE 602 using the sidelink between the second UE 606 and the first UE 602.

As illustrated at 618, the first UE 602 may receive the deactivation command to deactivate the direct link from the base station 604. The first UE 602 may receive the deactivation command over the direct link with the base station 604 or over the relay link. In some aspects, the first UE 602 may receive, from the base station 604, the deactivation command 620 to deactivate the direct link. In some aspects, the base station 604 may transmit the deactivation command 624 to the second UE 606 over a direct link between the base station and the second UE 606, and the second UE may relay the deactivation command 622 to the first UE 602 over a sidelink between the second UE 606 and the first UE 602, such that the first UE 602 receives the deactivation command over the relay link. The deactivation command may comprise L1 or L2 signaling. For example, the L1 signaling may comprise DCI or UCI, while the L2 signaling may comprise MAC-CE. In some aspects, the deactivation of the direct link may be immediate upon the reception of the deactivation command to deactivate the direct link. In some aspects, the first UE may transmit an acknowledgement of the reception of the deactivation command in order to deactivate the direct link. In some aspects, while the direct link is in a deactivated state, different levels of beam management may be considered. For example, the first UE may perform sparse L1 measurements or signaling, TCI state update, or beam failure detection or beam failure recovery for faster activation. The first UE may perform layer 3 (L3) measurements to determine an acceptable communication beam at the time of activation for the potential of an increased power operation. The determination of the acceptable communication beam may be indicated in an RRC configuration. In some aspects, the sidelink discontinuous reception (DRX) may also be considered to provide deactivated-like state with an increased off-time period.

In some aspects, for example as illustrated at 626, the first UE 602 or the base station 604 may transmit or receive a signal to request activation of the direction link between the first UE and the base station. For example, the first UE 602, at 626 may transmit or receive the signal to request activation of the direct link between the first UE 602 and the base station 604. The base station 604 transmits the activation request 630 to the second UE 606, and the second UE 606 relays the activation request 628 to the first UE 602. In some aspects, the first UE may transmit, to the second UE, the signal to request activation of the direct link. The second UE relays the signal to request activation of the direct link from the first UE to the base station using the relay link. For example, the first UE 602 transmits the activation request 628 to the second UE 606, and the second UE 606 relays the activation request 630 to the base station 604. In some aspects, the base station 604, at 626 may transmit or receive the signal to request activation of the first direct link between the first UE 602 and the base station 604. The base station may transmit, to the second UE, the signal to request activation of the first direct link. The second UE relays the signal to request activation of the first direct link from the base station to the first UE using the relay link. For example, the base station 604 transmits the activation request 630 to the second UE 606, and the second UE 606 relays the activation request 628 to the first UE 602. In some aspects, the base station may receive, from the second UE, the signal to request activation of the first direct link. The second UE relays the signal to request activation of the first direct link from the first UE to the base station using the relay link. For example, the first UE 602 transmits the activation request 628 to the second UE 606, and the second UE 606 relays the activation request 630 to the base station 604 over the second direct link between the second UE and the base station. In some aspects, the first UE or the base station may transmit the signal to request activation of the direct link based on at least one of detection of reduction of quality of the relay link, detection of an increase of quality of the direct link in comparison to the relay link, an arrival of data that is not supported by the relay link, or a change in power availability at the first UE. For example, the reduction of the quality of service of the relay link may be determined based at least on a detection of problems with the relay link, such as but not limited to, excessive delays or deterioration of the sidelink and/or the direct link between the second UE and the base station. In some aspects, the quality of service of the relay link may become worse such that the quality of service falls below a threshold and/or is not capable of fulfilling throughput, data rate, and/or delay requirements. In such instances, the relay link may be exchanged for the deactivated direct link that has a higher quality of service than the relay link. In some aspects, the quality or signal strength of the direct link becomes better than the relay link or in comparison to a threshold. In some aspects, the relay link may not provide requested service requirements based on data needs and channel quality. For example, in instances of the arrival of a significant amount of data that exceeds what can be handled by the relay link or the arrival of data having a high priority, the first UE may request the activation of the direct link. In some aspects, the first UE may encounter a change in power availability such the first UE that may support or allow for multiple active links, such that the direct link may be activated in response to change in power availability at the first UE. For example, the battery or power source of the first UE may become sufficiently charged so that the first UE has sufficient power to support two simultaneous links (e.g., direct link and relay link). The signal to request activation of the direction link between the first UE and the base station may comprise L1 or L2 signaling. For example, the L1 signaling may comprise DCI or UCI, while the L2 signaling may comprise MAC-CE.

In some aspects, the base station may transmit, to the second UE, an activation command or signal to activate the first direct link. The base station may transmit, to the second UE, the activation signal to activate the first direct link. The second UE may relay the activation signal from the base station to the first UE using the relay link. For example, the second UE receives the activation signal from the base station over the second direct link between the base station and the second UE, and the second UE relays the activation signal to the first UE over the sidelink, such that the base station transmits the activation signal to activate the first direct link using the relay link. The base station 604 may transmit the activation command 632 to the second UE 606, and the second UE 606 relays the activation command 634 to the first UE 602. The first UE may receive, from the second UE, the activation signal to activate the direct link. In some aspects, a time to trigger activation of the direct link may be based at least on a preconfigured number of subframes, reception of the activation signal, or transmission of an acknowledgement in response to the reception of the activation signal. In some aspects, the activation signal may comprise at least one of a configuration for the first UE to perform beam measurements of the direct link, an indication of one or more beams for use by the first UE after activation of the direct link, an allocation of grant resources for the first UE, instructions for the first UE to transmit a signal to the base station indicating that the first UE is ready to resume communication on the direct link, or an indication of timing of the activation of the direct link. In some aspects, the first UE may measure a plurality of direct link beams and select a direct link beam from the plurality of direct link beams having a highest signal quality.

In some aspects, activation of the direct link may be based on reception of the activation signal. For example, the first UE may activate the direct link upon reception of the activation signal or after a fixed time after the reception of the activation signal. In some aspects, the first UE may activate the direct link upon transmission of an acknowledgement of the reception of the activation signal. In some aspects, the UE may activate the direct link after a period of time after reception of the activation signal in which the first UE is ready to resume control and data communication on the direct link, based on the capability of the first UE. In some aspects, the first UE may activate the direct link upon completion of direct link beam measurements and selects the best beam, based at least on signal strength, from a plurality of candidate beams. In such instances, the first UE may report the measurements and may obtain the signaling for the beam to use on the direct link. In some aspects, the first UE may activate the direct link upon performing beam measurements and a random access channel (RACH) procedure on the selected beam on the direct link. In some aspects, the first UE may notify the base station that activation of the direct link is complete and request resources. In some aspects, if the beam selected or identified for use for the direct link is available and/or updated at the time activation signaling is received, the first UE may transmit the scheduling request on the direct link, wherein request resources and/or notification to the base station that activation is complete. The first UE may utilize the granted resources to transmit data, CSI report, L1 measurements, buffer status report, or power headroom report.

The activation command or signal (e.g., 632, 634) may comprise L1 or L2 signaling. For example, the L1 signaling may comprise DCI or UCI, while the L2 signaling may comprise MAC-CE. The L1 or L2 signaling may comprise information related to the direct link. For example, the L1 or L2 signaling may comprise at least one or reference signal information to perform beam measurements, one or more beams to use after the activation of the direct beam, grant resources to use (e.g., dynamic grant or configured grant semi-persistent scheduling), scheduling request resources where the first UE transmits the SR to notify the base station that the first UE is ready to resume data and/or control operations on the direct link, or a time to trigger (e.g., when the activation of the direct link occurs). In some aspects, the timer to trigger activation of the direct link may be implicit or explicit. For example, an implicit time to trigger activation may be based on a specific number of subframes or time period upon reception of the activation message or transmission of the acknowledgement of the reception of the activation message. The specific number of subframes or time period may be configured by RRC, may be a predetermined setting, or may be based on the capability supported by the UE. An explicit time to trigger activation may be specified in the activation signaling.

Figure 7:
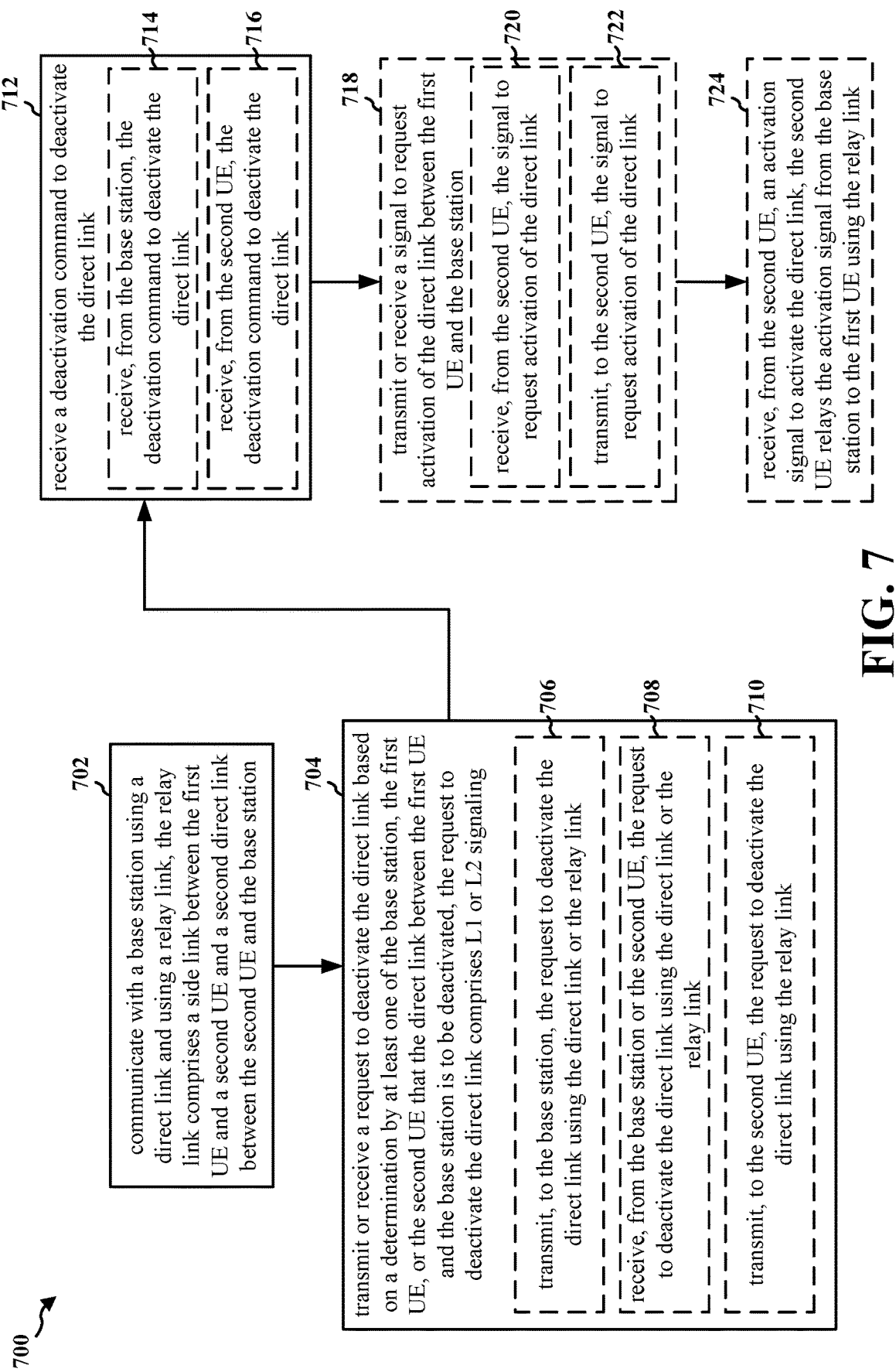
FIG. 7 is a flowchart of a method of wireless communication.

FIG. 7 is a flowchart 700 of a method of wireless communication. The method may be performed by a UE or a component of a UE (e.g., the UE 104, 402, 502, 602; the apparatus 802; the cellular baseband processor 804, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a first UE, in dual or multi-connectivity, to activate or deactivate a direct link with a base station using L1 or L2 signaling.

At 702, the first UE may communicate with a base station using a direct link and using a relay link. For example, 702 may be performed by communication component 840 of apparatus 802. The relay link may comprise a sidelink between the first UE and a second UE and a second direct link between the second UE and the base station. The second UE may comprise a relay UE. In the context of FIG. 6, the first UE 602, at 608, may communicate with a base station using a direct link and a relay link. The first UE may have multiple active links. For example, the first UE may have a direct link with the base station and may have an active sidelink with the second UE, wherein the second UE is a relay UE and relays communication between the base station and the first UE using the relay link. In some aspects, the second UE may comprise a plurality of relay UEs, such that each of the plurality of relay UEs relays data between the first UE and the base station. The plurality of relay UEs relay data between each other and the first UE using a sidelink, while at least one of the plurality of relay UFs relays data to and from the base station using a second direct link between the base station and the at least one of the plurality of relay UEs.

At 704, the first UE may transmit or receive a request to deactivate the direct link. For example, 704 may be performed by request component 842 of apparatus 802. The first UE may transmit or receive the request to deactivate the direct link based on a determination by at least one of the base station, the first UE, or the second UE that the direct link between the first UE and the base station is to be deactivated. The request to deactivate the direct link may comprise L1 or L2 signaling. In the context of FIG. 6, the first UE 602, at 610, may transmit or receive a request to deactivate the direct link. In some aspects, the direct link between the first UE and the base station may be determined to be deactivated based on at least one of a reduction of quality of service of the direct link, a signal quality of the direct link falling below a threshold, the relay link providing requested service requirements, or a power savings requirement at the first UE. For example, the reduction of the quality of service of the direct link may be determined based at least on a detection of problems with the direct link, such as but not limited to, excessive delays or deterioration of the link. In some aspects, the quality of service of the direct link may become worse than another available relay link or may become worse such that the quality of service falls below a threshold. In such instances, the direct link may be exchanged for a relaying link that has a higher quality of service than the direct link. In some aspects, the relay link may provide requested service requirements based on data needs and channel quality. In some aspects, the first UE may encounter power savings requirements due in part to low power availability at the first UE that may not support or allow for multiple active links, such that the direct link may be deactivated in an effort to reduce power consumption at the first UE while maintaining communication with the base station using the relay link with the second UE.

In some aspects, for example at 706, the first UE may transmit the request to deactivate the direct link to the base station. For example, 706 may be performed by request component 842 of apparatus 802. The first UE may transmit the request to deactivate the direct link to the base station using the direct link or the relay link. For example, the first UE may transmit the request to deactivate the direct link using the direct link, such that the request is originated at the first UE and transmitted to the base station over the direct link. In the context of FIG. 6, the first UE 602 may transmit the deactivation request 612 to the base station 604. In some aspects, the first UE may transmit the request using the relay link. For example, the first UE may transmit the request to deactivate the direct link to the second UE using the sidelink. The second UE relays the request to deactivate the direct link from the first UE to the base station using the relay link, such that the request is received by the second UE and is relayed to the base station over a second direct link between the second UE and the base station. In the context of FIG. 6, the first UE 602 transmits the deactivation request 614 to the second UE 606 using a sidelink, and the second UE 606 relays the deactivation request 616 to the base station 604 using a second direct link between the second UE 606 and the base station 604.

In some aspects, for example at 708, the first UE may receive the request to deactivate the direct link. For example, 708 may be performed by request component 842 of apparatus 802. The first UE may receive, from the base station or the second UE, the request to deactivate the direct link. The first UE may receive, from the base station or the second UE, the request to deactivate the direct link using the direct link or the relay link. For example, the request to deactivate the direct link may be received from the base station using the direct link. In the context of FIG. 6, the first UE 602 may receive the deactivation request 612 from the base station 604. In some aspects, the request to deactivate the direct link may be received from the second UE using the relay link. For example, the base station may transmit the request to deactivate the direct link to the second UE using the second direct link. The second UE relays the request to deactivate the direct link from the base station to the first UE using the relay link, such that the request is received by the second UE and is relayed to the first UE over the sidelink between the second UE and the first UE. In the context of FIG. 6, the base station 604 transmits the deactivation request 616 to the second UE 606, and the second UE 606 relays the deactivation request 614 to the first UE 602 using the sidelink between the second UE 606 and the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the request is transmitted from the base station 404 to the second Relay UE 406-2 over a second direct link between the second Relay UE 406-2 and the base station 404. The second Relay UE 406-2 relays the request to the first Relay UE 406-1 over a second sidelink 410-2 between the first Relay UE 406-1 and the second Relay UE 406-2. The first Relay UE 406-1 relays the request to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 710, the first UE may transmit the request to deactivate the direct link to the second UE. For example, 710 may be performed by request component 842 of apparatus 802. The first UE may transmit the request to deactivate the direct link to the second UE using the relay link. For example, the first UE may transmit the request to deactivate the direct link to the second UE using the sidelink between the first UE and the second UE. The second UE relays the request from the first UE to the base station using the second direct link between the second UE and the base station. In the context of FIG. 6, the first UE 602 transmits the deactivation request 614 to the second UE 606 over the sidelink between the first UE 602 and the second UE 606. The second UE 606 relays the deactivation request 616 to the base station 604 over the second direct link between the second UE 606 and the base station 604. In some aspects, the second UE may comprise at least one relay UE, such that the at least one relay UE receives the request from the first UE over the sidelink and relays the request to the base station over a direct link between the base station and the at least one relay UE. In some aspects, the at least one relay UE may comprise a plurality of relay UEs, such that the request is relayed to one or more of the plurality of UEs over respective sidelinks between the plurality of UEs, and then relayed to the base station over a direct link between one of the plurality of UEs and the base station. In the context of FIG. 4B, the plurality of relay UEs may comprise a first relay UE 406-1 and a second relay UE 406-2, wherein the request is transmitted from the UE 402 to the first Relay UE 406-1 over a first sidelink between the first Relay UE 406-1 and the first UE 402. The first Relay UE 406-1 relays the request to the second Relay UE 406-2 over a second sidelink between the first Relay UE 406-1 and a second Relay UE 406-2. The second Relay UE 406-2 relays the request to the base station 404 over a second direct link 408 between the second Relay UE 406-2 and the base station 404. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

At 712, the first UE may receive a deactivation command to deactivate the direct link. For example, 712 may be performed by deactivation component 844 of apparatus 802. In some aspects, the deactivation of the direct link may be immediate upon the reception of the deactivation command to deactivate the direct link. In some aspects, the first UE may transmit an acknowledgement of the reception of the deactivation command in order to deactivate the direct link. In the context of FIG. 6, the first UE 602, at 618, may receive the deactivation command to deactivate the direct link. In some aspects, while the direct link is in a deactivated state, different levels of beam management may be considered. For example, the first UE may perform sparse L1 measurements or signaling, TCI state update, or beam failure detection or beam failure recovery for faster activation. The first UE may perform layer 3 (L3) measurements to determine an acceptable communication beam at the time of activation for the potential of an increased power operation. The determination of the acceptable communication beam may be indicated in an RRC configuration. In some aspects, the sidelink discontinuous reception (DRX) may also be considered to provide deactivated-like state with an increased off-time period.

In some aspects, for example at 714, the first UE may receive, from the base station, the deactivation command to deactivate the direct link. For example, 714 may be performed by deactivation component 844 of apparatus 802. The deactivation command may comprise L1 or L2 signaling. In the context of FIG. 6, the first UE 602 may receive, from the base station 604, the deactivation command 620 to deactivate the direct link.

In some aspects, for example at 716, the first UE may receive, from the second UE, the deactivation command to deactivate the direct link. For example, 716 may be performed by deactivation component 844 of apparatus 802. The deactivation command may comprise L1 or L2 signaling. In some aspects, the second UE may comprise at least one relay UE and relays the deactivation command from the base station to the first UE using the relay link. In the context of FIG. 6, the base station 604 may transmit the deactivation command 624 to the second UE 606 over a direct link between the base station and the second UE 606, and the second UE may relay the deactivation command 622 to the first UE 602 over a sidelink between the second UE 606 and the first UE 602, such that the first UE 602 receives the deactivation command over the relay link. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the deactivation command is transmitted from the base station 404 to the second Relay UE 406-2 over a second direct link between the second Relay UE 406-2 and the base station 404. The second Relay UE 406-2 relays the activation command to the first Relay UE 406-1 over a second sidelink 410-2 between the first Relay UE 406-1 and the second Relay UE 406-2. The first Relay UE 406-1 relays the deactivation command to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 718, the first UE may transmit or receive a signal to request activation of the direct link between the first UE and the base station. For example, 718 may be performed by request component 842 of apparatus 802. In the context of FIG. 6, the first UE 602, at 626 may transmit or receive the signal to request activation of the direct link between the first UE 602 and the base station 604. In some aspects, the first UE may transmit the signal to request activation of the direct link based on at least one of detection of reduction of quality of the relay link, detection of an increase of quality of the direct link in comparison to the relay link, an arrival of data that is not supported by the relay link, or a change in power availability at the first UE. For example, the reduction of the quality of service of the relay link may be determined based at least on a detection of problems with the relay link, such as but not limited to, excessive delays or deterioration of the sidelink and/or the direct link between the second UE and the base station. In some aspects, the quality of service of the relay link may become worse such that the quality of service falls below a threshold and/or is not capable of fulfilling throughput, data rate, and/or delay requirements. In such instances, the relay link may be exchanged for the deactivated direct link that has a higher quality of service than the relay link. In some aspects, the quality or signal strength of the direct link becomes better than the relay link or in comparison to a threshold. In some aspects, the relay link may not provide requested service requirements based on data needs and channel quality. For example, in instances of the arrival of a significant amount of data that exceeds what can be handled by the relay link or the arrival of data having a high priority, the first UE may request the activation of the direct link. In some aspects, the first UE may encounter a change in power availability such the first UE that may support or allow for multiple active links, such that the direct link may be activated in response to change in power availability at the first UE. For example, the battery or power source of the first UE may become sufficiently charged so that the first UE has sufficient power to support two simultaneous links (e.g., direct link and relay link).

In some aspects, for example at 720, the first UE may receive, from the second UE, the signal to request activation of the direct link. For example, 720 may be performed by request component 842 of apparatus 802. The second UE relays the signal to request activation of the direct link from the base station to the first UE using the relay link. For example, the second UE receives the signal to request activation from the base station over the second direct link between the base station and the second UE, and the second UE relays the signal to request activation to the first UE over the sidelink, such that the first UE receives the signal to request activation of the direct link using the relay link. In the context of FIG. 6, the base station 604 transmits the activation request 630 to the second UE 606, and the second UE 606 relays the activation request 628 to the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the signal to request activation is transmitted from the base station 404 to the second Relay UE 406-2 over a second direct link between the second Relay UE 406-2 and the base station 404. The second Relay UE 406-2 relays the signal to request activation to the first Relay UE 406-1 over a second sidelink 410-2 between the first Relay UE 406-1 and the second Relay UE 406-2. The first Relay UE 406-1 relays the signal to request activation to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 722, the first UE may transmit, to the second UE, the signal to request activation of the direct link. For example, 722 may be performed by request component 842 of apparatus 802. The second UE relays the signal to request activation of the direct link from the first UE to the base station using the relay link. For example, the first UE transmits the signal to request activation to the second UE over the sidelink between the first UE and the second UE, and the second UE relays the signal to request activation to the base station over the second direct link between the second UE and the base station, such that the first UE transmits the signal to request activation of the direct link using the relay link. In the context of FIG. 6, the first UE 602 transmits the activation request 628 to the second UE 606, and the second UE 606 relays the activation request 630 to the base station 604. In some aspects, the second UE may comprise a plurality of relay UEs. In the context of FIG. 4B, the plurality of relay UEs may comprise a first relay UE 406-1 and a second relay UE 406-2, wherein the signal to request activation is transmitted from the UE 402 to the first Relay UE 406-1 over a first sidelink between the first Relay UE 406-1 and the first UE 402. The first Relay UE 406-1 relays the signal to request activation to the second Relay UE 406-2 over a second sidelink between the first Relay UE 406-1 and a second Relay UE 406-2. The second Relay UE 406-2 relays the signal to request activation to the base station 404 over a second direct link 408 between the second Relay UE 406-2 and the base station 404. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 724, the first UE may receive an activation signal to activate the direct link. For example, 724 may be performed by activation component 846 of apparatus 802. The first UE may receive, from the second UE, the activation signal to activate the direct link. The second UE may relay the activation signal from the base station to the first UE using the relay link. For example, the second UE receives the activation signal from the base station over the second direct link between the base station and the second UE, and the second UE relays the activation signal to the first UE over the sidelink, such that the first UE receives the activation signal to activate the direct link using the relay link. In the context of FIG. 6, the base station 604 may transmit the activation command 632 to the second UE 606, and the second UE 606 relays the activation command 634 to the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the activation signal is transmitted from the base station 404 to the second Relay UE 406-2 over a second direct link between the second Relay UE 406-2 and the base station 404. The second Relay UE 406-2 relays the activation signal to the first Relay UE 406-1 over a second sidelink 410-2 between the first Relay UE 406-1 and the second Relay UE 406-2. The first Relay UE 406-1 relays the activation signal to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, a time to trigger activation of the direct link may be based at least on a preconfigured number of subframes, reception of the activation signal, or transmission of an acknowledgement in response to the reception of the activation signal. In some aspects, the activation signal may comprise at least one of a configuration for the first UE to perform beam measurements of the direct link, an indication of one or more beams for use by the first UE after activation of the direct link, an allocation of grant resources for the first UE, instructions for the first UE to transmit a signal to the base station indicating that the first UE is ready to resume communication on the direct link, or an indication of timing of the activation of the direct link. In some aspects, the first UE may measure a plurality of direct link beams and select a direct link beam from the plurality of direct link beams having a highest signal quality.

In some aspects, activation of the direct link may be based on reception of the activation signal. For example, the first UE may activate the direct link upon reception of the activation signal or after a fixed time after the reception of the activation signal. In some aspects, the first UE may activate the direct link upon transmission of an acknowledgement of the reception of the activation signal. In some aspects, the UE may activate the direct link after a period of time after reception of the activation signal in which the first UE is ready to resume control and data communication on the direct link, based on the capability of the first UE. In some aspects, the first UE may activate the direct link upon completion of direct link beam measurements and selects the best beam, based at least on signal strength, from a plurality of candidate beams. In such instances, the first UE may report the measurements and may obtain the signaling for the beam to use on the direct link. In some aspects, the first UE may activate the direct link upon performing beam measurements and a random access channel (RACH) procedure on the selected beam on the direct link. In some aspects, the first UE may notify the base station that activation of the direct link is complete and request resources. In some aspects, if the beam selected or identified for use for the direct link is available and/or updated at the time activation signaling is received, the first UE may transmit the scheduling request on the direct link, wherein request resources and/or notification to the base station that activation is complete. The first UE may utilize the granted resources to transmit data, CSI report, L1 measurements, buffer status report, or power headroom report.

The activation signal may comprise L1 or L2 signaling. The L1 or L2 signaling may comprise information related to the direct link. For example, the L1 or L2 signaling may comprise at least one or reference signal information to perform beam measurements, one or more beams to use after the activation of the direct beam, grant resources to use (e.g., dynamic grant or configured grant semi-persistent scheduling), scheduling request resources where the first UE transmits the SR to notify the base station that the first UE is ready to resume data and/or control operations on the direct link, or a time to trigger (e.g., when the activation of the direct link occurs). In some aspects, the timer to trigger activation of the direct link may be implicit or explicit. For example, an implicit time to trigger activation may be based on a specific number of subframes or time period upon reception of the activation message or transmission of the acknowledgement of the reception of the activation message. The specific number of subframes or time period may be configured by RRC, may be a predetermined setting, or may be based on the capability supported by the UE. An explicit time to trigger activation may be specified in the activation signaling.

Figure 8:
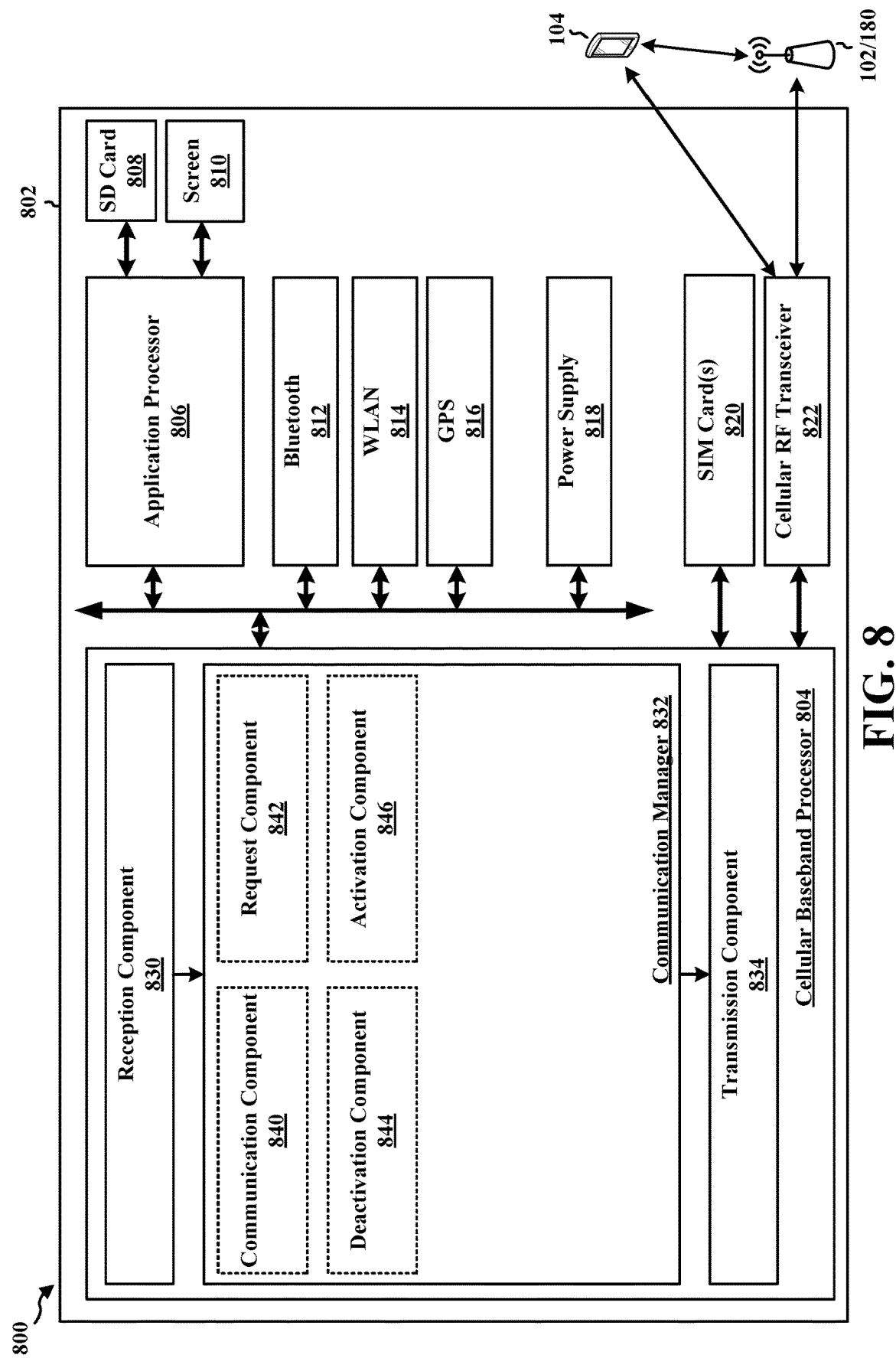
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see 350 of FIG. 3) and include the aforediscussed additional modules of the apparatus 802.

The communication manager 832 includes a communication component 840 that is configured to communicate with a base station using a direct link and using a relay link, e.g., as described in connection with 702 of FIG. 7. The communication manager 832 further includes a request component 842 that is configured to transmit or receive a request to deactivate the direct link, e.g., as described in connection with 704 of FIG. 7. The request component 842 may be configured to transmit the request to deactivate the direct link to the base station, e.g., as described in connection with 704 of FIG. 7. The request component 842 may be configured to receive the request to deactivate the direct link, e.g., as described in connection with 708 of FIG. 7. The request component 842 may be configured to transmit the request to deactivate the direct link to the second UE, e.g., as described in connection with 710 of FIG. 7. The request component 842 may be configured to transmit or receive a signal to request activation of the direct link between the first UE and the base station, e.g., as described in connection with 718 of FIG. 7. The request component 842 may be configured to receive, from the second UE, the signal to request activation of the direct link, e.g., as described in connection with 720 of FIG. 7. The request component 842 may be configured to transmit, to the second UE, the signal to request activation of the direct link, e.g., as described in connection with 722 of FIG. 7. The communication manager 832 further includes a deactivation component 844 that is configured to receive a deactivation command to deactivate the direct link, e.g., as described in connection with 712 of FIG. 7. The deactivation component 844 may be configured to receive, from the base station, the deactivation command to deactivate the direct link, e.g., as described in connection with 714 of FIG. 7. The deactivation component 844 may be configured to receive, from the second UE, the deactivation command to deactivate the direct link, e.g., as described in connection with 716 of FIG. 7. The communication manager 832 further includes an activation component 846 that is configured to may receive an activation signal to activate the direct link, e.g., as described in connection with 724 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for communicating with a base station using a direct link and using a relay link. The relay link comprises a sidelink between the first UE and a second UE and a second direct link between the second UE and the base station. The apparatus includes means for transmitting or receiving a request to deactivate the direct link based on a determination by at least one of the base station, the first UE, or the second UE that the direct link between the first UE and the base station is to be deactivated. The request to deactivate the direct link comprises L1 or L2 signaling. The apparatus includes means for receiving a deactivation command to deactivate the direct link. The means for transmitting or receiving the request to deactivate the direct link is configured to transmit, to the base station, the request to deactivate the direct link using the direct link or the relay link. The first UE transmits the request to deactivate the direct link using the direct link. The second UE relays the request to deactivate the direct link from the first UE to the base station using the relay link. The means for transmitting or receiving the request to deactivate the direct link is configured to receive, from the base station or the second UE, the request to deactivate the direct link using the direct link or the relay link. The request to deactivate the direct link is received from the base station using the direct link. The request to deactivate the direct link is received from the second UE. The second UE relays the request from the base station to the first UE using the relay link. The means for transmitting or receiving the request to deactivate the direct link is configured to transmit, to the second UE, the request to deactivate the direct link using the relay link. The second UE comprises at least one relay UE and relays the request from the first UE to the base station using the second direct link. The means for the receiving the deactivation command to deactivate the direct link is configured to receive, from the base station, the deactivation command to deactivate the direct link. The deactivation command comprises L1 or L2 signaling. The means for the receiving the deactivation command to deactivate the direct link is configured to receive, from the second UE, the deactivation command to deactivate the direct link. The second UE comprises at least one relay UE and relays the deactivation command from the base station to the first UE using the relay link. The apparatus further includes means for transmitting or receiving a signal to request activation of the direct link between the first UE and the base station. The apparatus further includes means for receiving, from the second UE, an activation signal to activate the direct link, wherein the second UE relays the activation signal from the base station to the first UE using the relay link. The means for transmitting or receiving the signal to request activation of the direct link is configured to receive, from the second UE, the signal to request activation of the direct link. The second UE relays the signal to request activation of the direct link from the base station to the first UE using the relay link. The means for transmitting or receiving the signal to request activation of the direct link is configured to transmit, to the second UE, the signal to request activation of the direct link. The second UE relays the signal to request activation of the direct link from the first UE to the base station using the relay link. The aforementioned means may be one or more of the aforementioned components of the apparatus 802 configured to perform the functions recited by the aforementioned means. As described supra, the apparatus 802 may include the TX Processor 368, the RX Processor 356, and the controller/ processor 359. As such, in one configuration, the aforementioned means may be the TX Processor 368, the RX Processor 356, and the controller/processor 359 configured to perform the functions recited by the aforementioned means.

Figure 9:
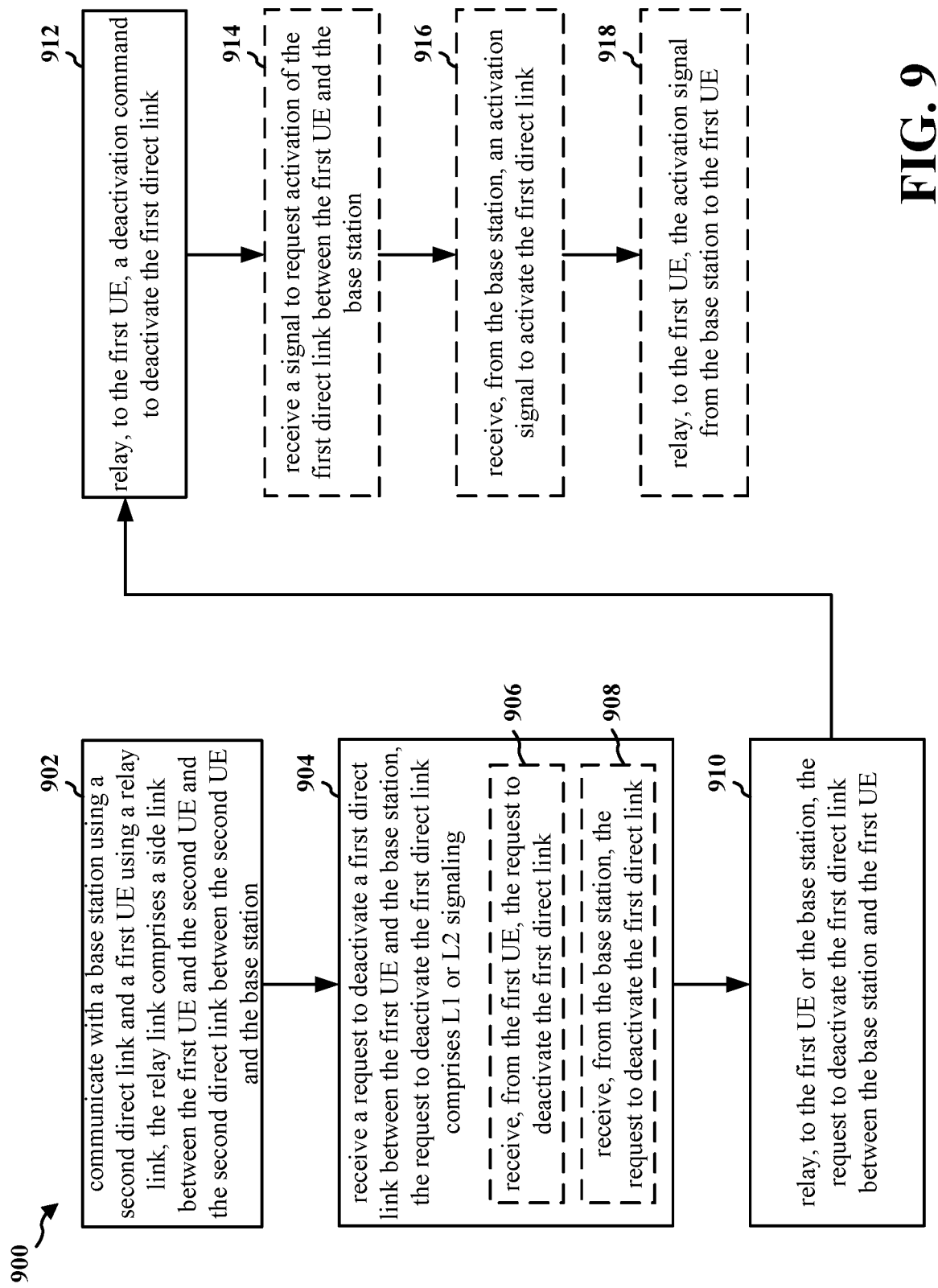
FIG. 9 is a flowchart of a method of wireless communication.

FIG. 9 is a flowchart 900 of a method of wireless communication. The method may be performed by a UE or a component of a UE (e.g., the UE 104, 406, 406-1, 406-2, 506, 606; the apparatus 1002; the cellular baseband processor 1004, which may include the memory 360 and which may be the entire UE 350 or a component of the UE 350, such as the TX processor 368, the RX processor 356, and/or the controller/processor 359). The UE in the aspect of FIG. 9 may comprise a relay UE. One or more of the illustrated operations may be omitted, transposed, or contemporaneous. Optional aspects are illustrated with a dashed line. The method may allow a second UE operating as a relay UE to assist in the activation or deactivation of a direct link between a first UE and a base station using L1 or L2 signaling.

At 902, the second UE may communicate with a base station using a second direct link and a first UE using a relay link. For example, 902 may be performed by communication component 1040 of apparatus 1002. The relay link may comprise a sidelink between the first UE and the second UE and the second direct link between the second UE and the base station. The second UE may comprise a relay UE. In the context of FIG. 6, the second UE 606, at 608, may communication with the first UE 602 using a sidelink and may communication with the base station 604 using a second direct link. The first UE may have multiple active links. For example, the first UE may have a direct link with the base station and may have an active sidelink with the second UE, wherein the second UE is a relay UE and relays communication between the base station and the first UE using the relay link. In some aspects, the second UE may comprise a plurality of relay UEs, such that each of the plurality of relay UEs relays data between the first UE and the base station. The plurality of relay UEs relay data between each other and the first UE using a sidelink, while at least one of the plurality of relay UEs relays data to and from the base station using a second direct link between the base station and the at least one of the plurality of relay UEs.

At 904, the second UE may receive a request to deactivate a first direct link between the first UE and the base station. For example, 904 may be performed by request component 1042 of apparatus 1002. The request to deactivate the first direct link may comprise L1 or L2 signaling. In the context of FIG. 6, the second UE 606 may receive a deactivation request 614 from the first UE 602, or may receive a deactivation request 616 from the base station 604. In some aspects, the direct link between the first UE and the base station may be determined to be deactivated based on at least one of a reduction of quality of service of the direct link, a signal quality of the direct link falling below a threshold, the relay link providing requested service requirements, or a power savings requirement at the first UE. For example, the reduction of the quality of service of the direct link may be determined based at least on a detection of problems with the direct link, such as but not limited to, excessive delays or deterioration of the link. In some aspects, the quality of service of the direct link may become worse than another available relay link or may become worse such that the quality of service falls below a threshold. In such instances, the direct link may be exchanged for a relaying link that has a higher quality of service than the direct link. In some aspects, the relay link may provide requested service requirements based on data needs and channel quality. In some aspects, the first UE may encounter power savings requirements due in part to low power availability at the first UE that may not support or allow for multiple active links, such that the direct link may be deactivated in an effort to reduce power consumption at the first UE while maintaining communication with the base station using the relay link with the second UE.

In some aspects, for example at 906, the second UE may receive, from the first UE, the request to deactivate the first direct link. For example, 906 may be performed by request component 1042 of apparatus 1002. The second UE may relay the request to deactivate the first direct link between the first UE and the base station to the base station. The second UE may receive the request to deactivate the first direct link from the first UE using the relay link. For example, the second UE may receive the request to deactivate the first direct link from the first UE using the sidelink between the first UE and the second UE. The second UE relays the request from the first UE to the base station using the second direct link between the second UE and the base station. In the context of FIG. 6, the second UE 606 receives the deactivation request 614 from the first UE 602 over the sidelink between the first UE 602 and the second UE 606. The second UE 606 relays the deactivation request 616 to the base station 604 over the second direct link between the second UE 606 and the base station 604. In some aspects, the second UE may comprise a plurality of relay UEs. In the context of FIG. 4B, the plurality of relay UEs may comprise a first relay UE 406-1 and a second relay UE 406-2, wherein the request to deactivate the first direct link is transmitted from the UE 402 to the first Relay UE 406-1 over a first sidelink between the first Relay UE 406-1 and the first UE 402. The first Relay UE 406-1 relays the request to deactivate the first direct link to the second Relay UE 406-2 over a second sidelink between the first Relay UE 406-1 and a second Relay UE 406-2. The second Relay UE 406-2 relays the request to deactivate the first direct link to the base station 404 over a second direct link 408 between the second Relay UE 406-2 and the base station 404. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 908, the second UE may receive, from the base station, the request to deactivate the first direct link. For example, 908 may be performed by request component 1042 of apparatus 1002. The base station may transmit the request to deactivate the first direct link to the second UE using the second direct link. The second UE relays the request to deactivate the first direct link from the base station to the first UE using the relay link, such that the request is received by the second UE and is relayed to the first UE over the sidelink between the second UE and the first UE. In the context of FIG. 6, the base station 604 transmits the deactivation request 616 to the second UE 606, and the second UE 606 relays the deactivation request 614 to the first UE 602 using the sidelink between the second UE 606 and the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the request to deactivate the first direct link is transmitted from the base station 404 to the second Relay UE 406-2 over a second direct link between the second Relay UE 406-2 and the base station 404. The second Relay UE 406-2 relays the request to deactivate the first direct link to the first Relay UE 406-1 over a second sidelink 410-2 between the first Relay UE 406-1 and the second Relay UE 406-2. The first Relay UE 406-1 relays the request to deactivate the first direct link to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

At 910, the second UE may relay the request to deactivate the first direct link between the base station and the first UE. For example, 910 may be performed by relay component 1044 of apparatus 1002. The second UE may relay, to the first UE or the base station, the request to deactivate the first direct link between the base station and the first UE. In some aspects, the second UE may receive the request to deactivate the first direct link from the first UE using the sidelink between the first UE and the second UE. The second UE relays the request from the first UE to the base station using the second direct link between the second UE and the base station. In the context of FIG. 6, the second UE 606 receives the deactivation request 614 from the first UE 602 over the sidelink between the first UE 602 and the second UE 606. The second UE 606 relays the deactivation request 616 to the base station 604 over the second direct link between the second UE 606 and the base station 604. In some aspects, the second UE may receive the request to deactivate the first direct link from the base station using the second direct link between the second UE and base station. The second UE relays the request from the base station to the first UE using the sidelink between the second UE and the first UE. In the context of FIG. 6, the second UE 606 receives the deactivation request 616 from the base station 604, and the second UE 606 relays the deactivation request 614 to the first UE 602 using the sidelink between the second UE 606 and the first UE 602. In some aspects, the second UE may comprise at least one relay UE, such that the at least one relay UE receives the request from the first UE over the sidelink. In some aspects, the at least one relay UE receives the request from the base station over the second direct link. The at least one relay UE relays the request to the base station over a second direct link between the base station and the at least one relay UE. The at least one relay UE relays the request to the first UE over a sidelink between the first UE and the at least one relay UE. In some aspects, the at least one relay UE may comprise a plurality of relay UEs, such that the request is relayed to one or more of the plurality of UEs over respective sidelinks between the plurality of UEs, and then relayed to the base station over a direct link between one of the plurality of UEs and the base station or relayed to the first UE over respective sidelinks between the plurality of UEs and the first UE.

At 912, the second UE may relay, to the first UE, a deactivation command to deactivate the first direct link. For example, 912 may be performed by deactivation component 1046 of apparatus 1002. The deactivation command may be received from the base station using the second direct link and may be relayed to the first UE using the sidelink. In some aspects, the deactivation command may comprise L1 or L2 signaling. The second UE may receive the deactivation command from the base station over the second direct link. The second UE relays the deactivation command from the base station to the first UE over the sidelink between the first UE and the second UE. In the context of FIG. 6, the base station 604 may transmit the deactivation command 624 to the second UE 606 over a direct link between the base station and the second UE 606, and the second UE may relay the deactivation command 622 to the first UE 602 over a sidelink between the second UE 606 and the first UE 602, such that the first UE 602 receives the deactivation command over the relay link. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the deactivation command is transmitted from the base station 404 to the second Relay UE 406-2 over a second direct link between the second Relay UE 406-2 and the base station 404. The second Relay UE 406-2 relays the activation command to the first Relay UE 406-1 over a second sidelink 410-2 between the first Relay UE 406-1 and the second Relay UE 406-2. The first Relay UE 406-1 relays the deactivation command to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 914, the second UE may receive a signal to request activation of the first direct link between the first UE and the base station. For example, 914 may be performed by request component 1042 of apparatus 1002. In some aspects, the signal to request activation of the first direct link may be received from the base station using the second direct link. The signal to request activation of the first direct link may be relayed to the first UE using the relay link. The second UE relays the signal to request activation of the direct link from the base station to the first UE using the relay link. For example, the second UE receives the signal to request activation from the base station over the second direct link between the base station and the second UE, and the second UE relays the signal to request activation to the first UE over the sidelink, such that the first UE receives the signal to request activation of the direct link using the relay link. In the context of FIG. 6, the second UE 606 receives the activation request 630 from the base station 604, and the second UE 606 relays the activation request 628 to the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the signal to request activation is transmitted from the base station 404 to the second Relay UE 406-2 over a second direct link between the second Relay UE 406-2 and the base station 404. The second Relay UE 406-2 relays the signal to request activation to the first Relay UE 406-1 over a second sidelink 410-2 between the first Relay UE 406-1 and the second Relay UE 406-2. The first Relay UE 406-1 relays the signal to request activation to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, the signal to request activation of the first direct link may be received from the first UE. The signal to request activation of the first direct link may be relayed to the base station using the relay link. The second UE relays the signal to request activation of the direct link from the first UE to the base station using the relay link. For example, the second UE receives the signal to request activation from the first UE over the sidelink between the first UE and the second UE, and the second UE relays the signal to request activation to the base station over the second direct link between the second UE and the base station. In the context of FIG. 6, the second UE 606 receives the activation request 628 from the first UE 602, and the second UE 606 relays the activation request 630 to the base station 604. In some aspects, the second UE may comprise a plurality of relay UEs. In the context of FIG. 4B, the plurality of relay UEs may comprise a first relay UE 406-1 and a second relay UE 406-2, wherein the signal to request activation is transmitted from the UE 402 to the first Relay UE 406-1 over a first sidelink between the first Relay UE 406-1 and the first UE 402. The first Relay UE 406-1 relays the signal to request activation to the second Relay UE 406-2 over a second sidelink between the first Relay UE 406-1 and a second Relay UE 406-2. The second Relay UE 406-2 relays the signal to request activation to the base station 404 over a second direct link 408 between the second Relay UE 406-2 and the base station 404. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 916, the second UE may receive, from the base station, an activation signal to activate the first direct link. For example, 916 may be performed by activation component 1048 of apparatus 1002. The second UE may receive the activation signal from the base station over the second direct link between the base station and the second UE. In the context of FIG. 6, the second UE 606 receives the activation command 632 from the base station 604. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the activation signal to activate the first direct link is transmitted from the base station 404 to the second Relay UE 406-2 over a second direct link between the second Relay UE 406-2 and the base station 404. The second Relay UE 406-2 relays the activation signal to activate the first direct link to the first Relay UE 406-1 over a second sidelink 410-2 between the first Relay UE 406-1 and the second Relay UE 406-2. The first Relay UE 406-1 relays the activation signal to activate the first direct link to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 918, the second UE may relay, to the first UE, the activation signal from the base station to the first UE. For example, 918 may be performed by activation component 1048 of apparatus 1002. The second UE may relay the activation signal from the base station to the first UE using the relay link. For example, the second UE receives the activation signal from the base station over the second direct link between the base station and the second UE, and the second UE relays the activation signal to the first UE over the sidelink. In the context of FIG. 6, the second UE 606 may receive the activation command 632 from the base station 604, and the second UE 606 relays the activation command 634 to the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the activation signal is transmitted from the base station 404 to the second Relay UE 406-2 over a second direct link between the second Relay UE 406-2 and the base station 404. The second Relay UE 406-2 relays the activation signal to the first Relay UE 406-1 over a second sidelink 410-2 between the first Relay UE 406-1 and the second Relay UE 406-2. The first Relay UE 406-1 relays the activation signal to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, a time to trigger activation of the first direct link may be based at least on a preconfigured number of subframes, reception of the activation signal, or transmission of an acknowledgement in response to the reception of the activation signal. In some aspects, the activation signal may comprise at least one of a configuration for the first UE to perform beam measurements of the first direct link, an indication of one or more beams for use by the first UE after activation of the first direct link, an allocation of grant resources for the first UE, instructions for the first UE to transmit a signal to the base station indicating that the first UE is ready to resume communication on the first direct link, or an indication of timing of the activation of the first direct link. The activation signal may comprise L1 or L2 signaling. The L1 or L2 signaling may comprise information related to the first direct link. For example, the L1 or L2 signaling may comprise at least one or reference signal information to perform beam measurements, one or more beams to use after the activation of the first direct beam, grant resources to use (e.g., dynamic grant or configured grant semi-persistent scheduling), scheduling request resources where the first UE transmits the SR to notify the base station that the first UE is ready to resume data and/or control operations on the first direct link, or a time to trigger (e.g., when the activation of the direct link occurs). In some aspects, the timer to trigger activation of the first direct link may be implicit or explicit. For example, an implicit time to trigger activation may be based on a specific number of subframes or time period upon reception of the activation message or transmission of the acknowledgement of the reception of the activation message. The specific number of subframes or time period may be configured by RRC, may be a predetermined setting, or may be based on the capability supported by the UE. An explicit time to trigger activation may be specified in the activation signaling.

Figure 10:
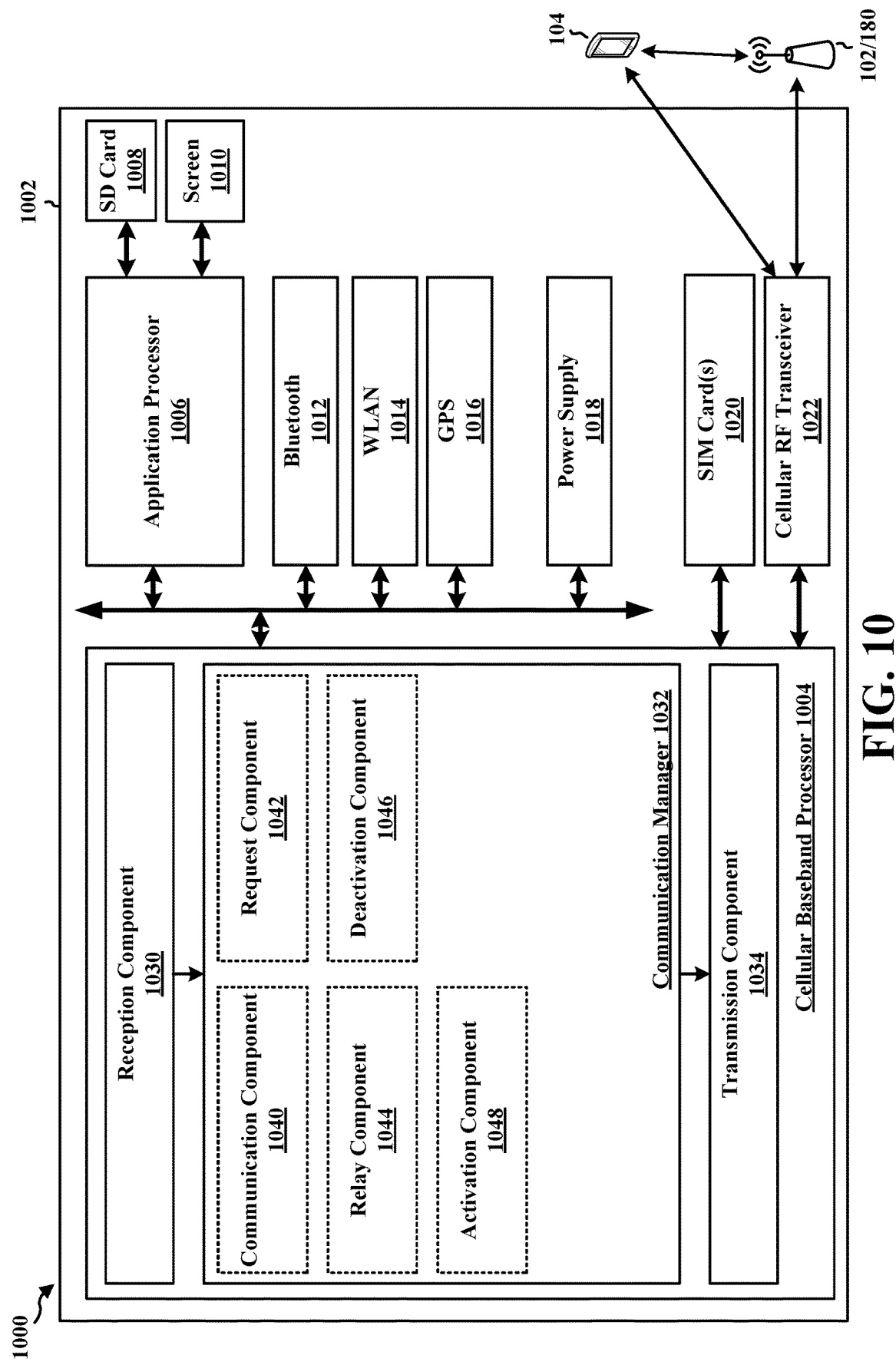
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the aforediscussed additional modules of the apparatus 1002.

The communication manager 1032 includes a communication component 1040 that is configured to communicate with a base station using a second direct link and a first UE using a relay link, e.g., as described in connection with 902 of FIG. 9. The communication manager 1032 further includes a request component 1042 that is configured to receive a request to deactivate a first direct link between the first UE and the base station, e.g., as described in connection with 904 of FIG. 9. The request component 1042 may be configured to receive, from the first UE, the request to deactivate the first direct link, e.g., as described in connection with 906 of FIG. 9. The request component 1042 may be configured to receive, from the base station, the request to deactivate the first direct link, e.g., as described in connection with 908 of FIG. 9. The request component 1042 may be configured to receive a signal to request activation of the first direct link between the first UE and the base station, e.g., as described in connection with 914 of FIG. 9. The communication manager 1032 further includes a relay component 1044 that is configured to relay the request to deactivate the first direct link between the base station and the first UE, e.g., as described in connection with 910 of FIG. 9. The communication manager 1032 further includes a deactivation component 1046 that is configured to relay, to the first UE, a deactivation command to deactivate the first direct link, e.g., as described in connection with 912 of FIG. 9. The communication manager 1032 further includes an activation component 1048 that is configured to receive, from the base station, an activation signal to activate the first direct link, e.g., as described in connection with 916 of FIG. 9. The activation component 1048 may be configured to relay, to the first UE, the activation signal from the base station to the first UE, e.g., as described in connection with 918 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for communicating with a base station using a second direct link and a first UE using a relay link. The relay link comprises a sidelink between the first UE and the second UE and the second direct link between the second UE and the base station. The apparatus includes means for receiving a request to deactivate a first direct link between the first UE and the base station. The request to deactivate the first direct link comprises L1 or L2 signaling. The apparatus includes means for relaying, to the first UE or the base station, the request to deactivate the first direct link between the base station and the first UE. The apparatus includes means for relaying, to the first UE, a deactivation command to deactivate the first direct link. The means for receiving the request to deactivate the first direct link is configured to receive, from the first UE, the request to deactivate the first direct link, wherein the second UE relays the request to deactivate the first direct link to the base station. The means for receiving the request to deactivate the first direct link is configured to receiving, from the base station, the request to deactivate the first direct link, wherein the second UE relays the request to deactivate the first direct link to the first UE. The apparatus further includes means for receiving a signal to request activation of the first direct link between the first UE and the base station. The apparatus further includes means for receiving, from the base station, an activation signal to activate the first direct link. The apparatus further includes means for relaying, to the first UE, the activation signal from the base station to the first UE. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
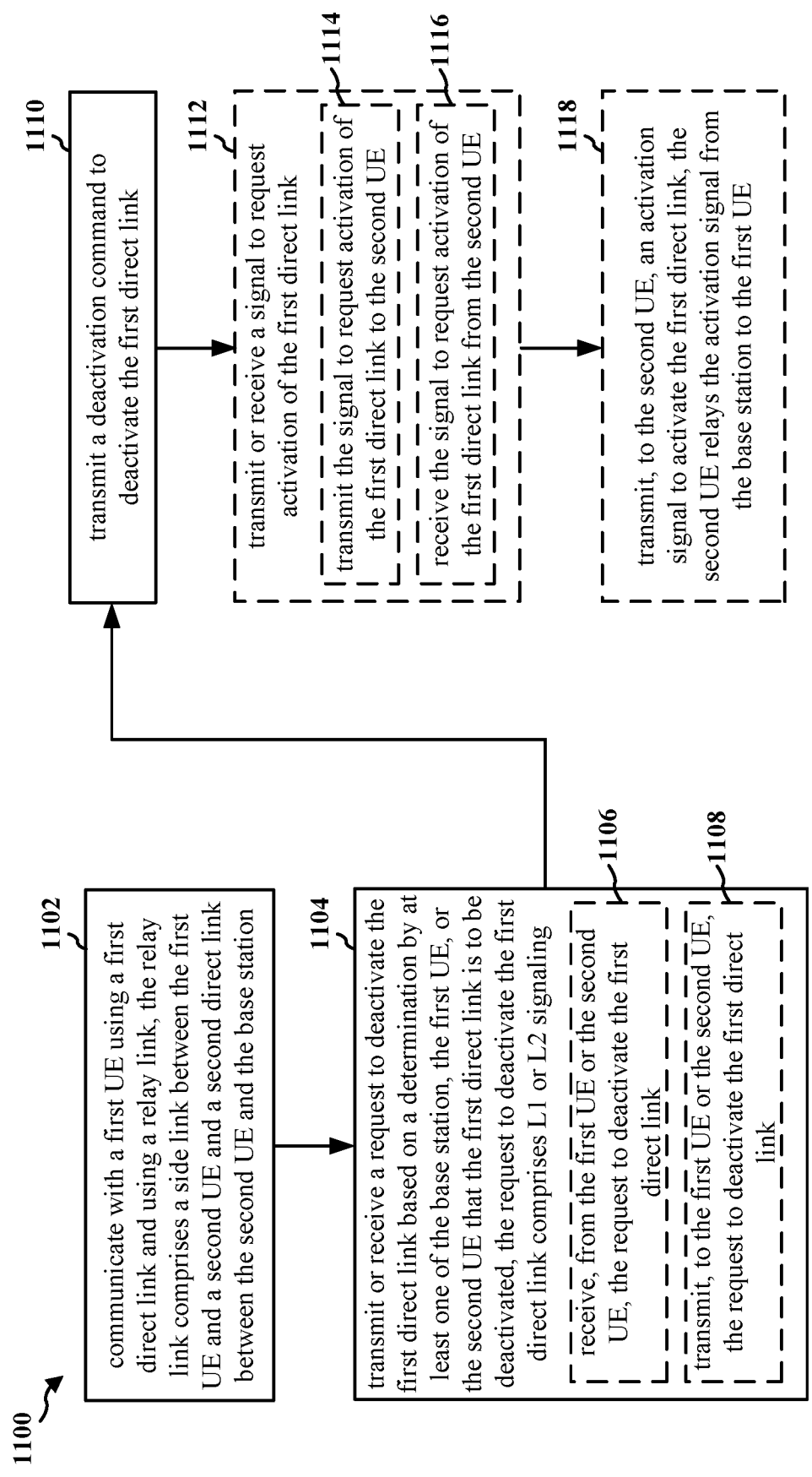
FIG. 11 is a flowchart of a method of wireless communication.

FIG. 11 is a flowchart 1100 of a method of wireless communication. The method may be performed by a base station or a component of a base station (e.g., the base station 102/180, 404, 604; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to activate or deactivate a direct link with a first UE using L1 or L2 signaling.

At 1102, the base station may communicate with a first UE using a first direct link and using a relay link. For example, 1102 may be performed by communication component 1240 of apparatus 1202. The relay link may comprise a sidelink between the first UE and a second UE and a second direct link between the second UE and the base station. The second UE may comprise a relay UE. In the context of FIG. 6, the base station 604, at 608, may communicate with a first UE 602 using a direct link and a relay link. The first UE may have multiple active links. For example, the first UE may have a direct link with the base station and may have an active sidelink with the second UE, wherein the second UE is a relay UE and relays communication between the base station and the first UE using the relay link. In some aspects, the second UE may comprise a plurality of relay UEs, such that each of the plurality of relay UEs relays data between the first UE and the base station. The plurality of relay UEs relay data between each other and the first UE using a sidelink, while at least one of the plurality of relay UEs relays data to and from the base station using a second direct link between the base station and the at least one of the plurality of relay UEs.

At 1104, the base station may transmit or receive a request to deactivate the first direct link. For example, 1104 may be performed by request component 1242 of apparatus 1202. The base station may transmit or receive the request to deactivate the first direct link based on a determination by at least one of the base station, the first UE, or the second UE that the first direct link between the first UE and the base station is to be deactivated. The request to deactivate the first direct link may comprise L1 or L2 signaling. In the context of FIG. 6, the base station 604, at 610, may transmit or receive a request to deactivate the first direct link. In some aspects, the first direct link between the first UE and the base station may be determined to be deactivated based on at least one of a reduction of quality of service of the direct link, a signal quality of the direct link falling below a threshold, the relay link providing requested service requirements, or a power savings requirement at the first UE. For example, the reduction of the quality of service of the first direct link may be determined based at least on a detection of problems with the first direct link, such as but not limited to, excessive delays or deterioration of the link. In some aspects, the quality of service of the first direct link may become worse than another available relay link or may become worse such that the quality of service falls below a threshold. In such instances, the first direct link may be exchanged for a relaying link that has a higher quality of service than the direct link. In some aspects, the relay link may provide requested service requirements based on data needs and channel quality. In some aspects, the first UE may encounter power savings requirements due in part to low power availability at the first UE that may not support or allow for multiple active links, such that the first direct link may be deactivated in an effort to reduce power consumption at the first UE while maintaining communication with the base station using the relay link with the second UE.

In some aspects, for example at 1106, the base station may receive, from the first UE or the second UE, the request to deactivate the first direct link. For example, 1106 may be performed by request component 1242 of apparatus 1202. The base station may receive, from the first UE or the second UE, the request to deactivate the first direct link. The base station may receive, from the first UE or the second UE, the request to deactivate the first direct link using the first direct link or the relay link. For example, the request to deactivate the first direct link may be received from the first UE using the direct link. In the context of FIG. 6, the base station 604 may receive the deactivation request 612 from the first UE 602. In some aspects, the request to deactivate the first direct link may be received from the second UE using the relay link. For example, the first UE may transmit the request to deactivate the first direct link to the second UE using the sidelink. The second UE relays the request to deactivate the first direct link from the first UE to the base station using the relay link, such that the request is received by the second UE and is relayed to the base station over the second direct link between the second UE and the base station. In the context of FIG. 6, the first UE 602 transmits the deactivation request 614 to the second UE 606, and the second UE 606 relays the deactivation request 616 to the base station 604 using the second direct link between the second UE 606 and the base station 604. In the context of FIG. 4B, the plurality of relay UEs may comprise a first relay UE 406-1 and a second relay UE 406-2, wherein the request to deactivate the first direct link is transmitted from the UE 402 to the first Relay UE 406-1 over a first sidelink between the first Relay UE 406-1 and the first UE 402. The first Relay UE 406-1 relays the request to deactivate the first direct link to the second Relay UE 406-2 over a second sidelink between the first Relay UE 406-1 and a second Relay UE 406-2. The second Relay UE 406-2 relays the request to deactivate the first direct link to the base station 404 over a second direct link 408 between the second Relay UE 406-2 and the base station 404. In the example of FIG. 4B, the plurality of relay UFs comprise two relay UEs. However, the disclosure is not intended to be limited to the aspects disclosed herein. In some aspects, the plurality of relay UEs may comprise more than two relay UEs.

In some aspects, for example at 1108, the base station may transmit, to the first UE or the second UE, the request to deactivate the first direct link. For example, 1108 may be performed by request component 1242 of apparatus 1202. The base station may transmit, to the first UE or the second UE, the request to deactivate the first direct link. The base station may transmit, to the first UE or the second UE, the request to deactivate the first direct link using the first direct link or the relay link. For example, the request to deactivate the first direct link may be transmitted to the first UE using the first direct link. In the context of FIG. 6, the base station 604 may transmit the deactivation request 612 to the first UE 602. In some aspects, the request to deactivate the first direct link may be transmitted to the second UE using the relay link. For example, the base station may transmit the request to deactivate the first direct link to the second UE using the second direct link between the second UE and the base station. The second UE relays the request to deactivate the first direct link from the base station to the first UE using the relay link, such that the request is received by the second UE and is relayed to the first UE over the sidelink between the second UE and the first UE. In the context of FIG. 6, the base station 604 transmits the deactivation request 616 to the second UE 606, and the second UE 606 relays the deactivation request 614 to the first UE 602 using the sidelink between the second UE 606 and the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the request to deactivate the first direct link is transmitted from the base station 404 to the second Relay UE 406-2 over a second direct link between the second Relay UE 406-2 and the base station 404. The second Relay UE 406-2 relays the request to deactivate the first direct link to the first Relay UE 406-1 over a second sidelink 410-2 between the first Relay UE 406-1 and the second Relay UE 406-2. The first Relay UE 406-1 relays the request to deactivate the first direct link to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

At 1110, the base station may transmit a deactivation command to deactivate the first direct link. For example, 1110 may be performed by deactivation component 1244 of apparatus 1202. In some aspects, the deactivation of the first direct link may be immediate upon the reception of the deactivation command, by the first UE, to deactivate the first direct link. In some aspects, the first UE may transmit an acknowledgement, to the base station, of the reception of the deactivation command in order to deactivate the direct link. In the context of FIG. 6, the base station 604, at 618, may transmit the deactivation command to deactivate the direct link. In some aspects, while the first direct link is in a deactivated state, different levels of beam management may be considered. For example, the first UE may perform sparse L1 measurements or signaling, TCI state update, or beam failure detection or beam failure recovery for faster activation. The first UE may perform layer 3 (L3) measurements to determine an acceptable communication beam at the time of activation for the potential of an increased power operation. The determination of the acceptable communication beam may be indicated in an RRC configuration. In some aspects, the sidelink discontinuous reception (DRX) may also be considered to provide deactivated-like state with an increased off-time period. In some aspects, the base station may transmit, to the first UE or the second UE, the deactivation command to deactivate the first direct link. The deactivation command may be transmitted to the first UE using the first direct link. The deactivation command may be transmitted to the second UE and relayed to the first UE, by the second UE, using the relay link. For example, the base station may transmit the deactivation command to the second UE over the second direct link, and the second UE may relay the deactivation command to the first UE over the sidelink between the first UE and the second UE. In the context of FIG. 6, the base station 604 transmits the deactivation command 620 to the first UE 602 over the first direct link. In the context of FIG. 6, the base station 604 transmits the deactivation command 624 to the second UE 606 over the second direct link, and the second UE 606 relays the deactivation command 622 to the first UE 602 over the sidelink between the first UE 602 and the second UE 606. The deactivation command may comprise L1 or L2 signaling. In some aspects, the second UE may comprise at least one relay UE and relays the deactivation command from the base station to the first UE using the relay link.

In some aspects, for example at 1112, the base station may transmit or receive a signal to request activation of the first direct link. For example, 1112 may be performed by request component 1242 of apparatus 1202. In the context of FIG. 6, the base station 604, at 626 may transmit or receive the signal to request activation of the first direct link between the first UE 602 and the base station 604. In some aspects, the base station may transmit the signal to request activation of the first direct link based on at least one of detection of reduction of quality of the relay link, detection of an increase of quality of the direct link in comparison to the relay link, an arrival of data that is not supported by the relay link, or a change in power availability at the first UE. For example, the reduction of the quality of service of the relay link may be determined based at least on a detection of problems with the relay link, such as but not limited to, excessive delays or deterioration of the sidelink and/or the direct link between the second UE and the base station. In some aspects, the quality of service of the relay link may become worse such that the quality of service falls below a threshold and/or is not capable of fulfilling throughput, data rate, and/or delay requirements. In such instances, the relay link may be exchanged for the deactivated first direct link that has a higher quality of service than the relay link. In some aspects, the quality or signal strength of the first direct link becomes better than the relay link or in comparison to a threshold. In some aspects, the relay link may not provide requested service requirements based on data needs and channel quality. For example, in instances of the arrival of a significant amount of data that exceeds what can be handled by the relay link or the arrival of data having a high priority, the base station may request the activation of the first direct link. In some aspects, the first UE may encounter a change in power availability such the first UE that may support or allow for multiple active links, such that the first direct link may be activated in response to change in power availability at the first UE. For example, the battery or power source of the first UE may become sufficiently charged so that the first UE has sufficient power to support two simultaneous links (e.g., direct link and relay link).

In some aspects, for example at 1114, the base station may transmit, to the second UE, the signal to request activation of the first direct link. For example, 1114 may be performed by request component 1242 of apparatus 1202. The second UE relays the signal to request activation of the first direct link from the base station to the first UE using the relay link. For example, the base station transmits the signal to request activation to the second UE over the second direct link between the base station and the second UE, and the second UE relays the signal to request activation to the first UE over the sidelink between the second UE and the first UE, such that the base station transmits the signal to request activation of the first direct link using the relay link. In the context of FIG. 6, the base station 604 transmits the activation request 630 to the second UE 606, and the second UE 606 relays the activation request 628 to the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the signal to request activation is transmitted from the base station 404 to the second Relay UE 406-2 over a second direct link between the second Relay UE 406-2 and the base station 404. The second Relay UE 406-2 relays the signal to request activation to the first Relay UE 406-1 over a second sidelink 410-2 between the first Relay UE 406-1 and the second Relay UE 406-2. The first Relay UE 406-1 relays the signal to request activation to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 1116, the base station may receive, from the second UE, the signal to request activation of the first direct link. For example, 1116 may be performed by request component 1242 of apparatus 1202. The second UE relays the signal to request activation of the first direct link from the first UE to the base station using the relay link. For example, the second UE receives the signal to request activation from the first UE over the sidelink between the first UE and the second UE, and the second UE relays the signal to request activation to the base station over the second direct link, such that the base station receives the signal to request activation of the first direct link using the relay link. In the context of FIG. 6, the first UE 602 transmits the activation request 628 to the second UE 606, and the second UE 606 relays the activation request 630 to the base station 604 over the second direct link between the second UE and the base station. In some aspects, the second UE may comprise a plurality of relay UEs. In the context of FIG. 4B, the plurality of relay UEs may comprise a first relay UE 406-1 and a second relay UE 406-2, wherein the signal to request activation is transmitted from the UE 402 to the first Relay UE 406-1 over a first sidelink between the first Relay UE 406-1 and the first UE 402. The first Relay UE 406-1 relays the signal to request activation to the second Relay UE 406-2 over a second sidelink between the first Relay UE 406-1 and a second Relay UE 406-2. The second Relay UE 406-2 relays the signal to request activation to the base station 404 over a second direct link 408 between the second Relay UE 406-2 and the base station 404. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, for example at 1118, the base station may transmit, to the second UE, an activation signal to activate the first direct link. For example, 1118 may be performed by activation component 1246 of apparatus 1202. The base station may transmit, to the second UE, the activation signal to activate the first direct link. The second UE may relay the activation signal from the base station to the first UE using the relay link. For example, the second UE receives the activation signal from the base station over the second direct link between the base station and the second UE, and the second UE relays the activation signal to the first UE over the sidelink, such that the base station transmits the activation signal to activate the first direct link using the relay link. In the context of FIG. 6, the base station 604 may transmit the activation command 632 to the second UE 606, and the second UE 606 relays the activation command 634 to the first UE 602. In some aspects, the second UE may comprise a plurality of relay UEs. In the context of FIG. 4B, the second UE comprises a plurality of relay UEs. For example, the plurality of relay UEs may comprise a first relay UE 406-1 and a second relay UE 406-2, wherein the activation signal is transmitted from the base station 404 to the second Relay UE 406-2 over a second direct link between the second Relay UE 406-2 and the base station 404. The second Relay UE 406-2 relays the activation signal to the first Relay UE 406-1 over a second sidelink 410-2 between the first Relay UE 406-1 and the second Relay UE 406-2. The first Relay UE 406-1 relays the activation signal to the UE 402 over a first sidelink 410-1 between the first Relay UE 406-1 and the UE 402. In the example of FIG. 4B, the plurality of relay UEs comprise two relay UEs. However, the disclosure is not intended to be limited to the aspects disclosed herein. In some aspects, the plurality of relay UEs may comprise more than two relay UEs.

In some aspects, a time to trigger activation of the direct link may be based at least on a preconfigured number of subframes, reception of the activation signal, or transmission of an acknowledgement in response to the reception of the activation signal. In some aspects, the activation signal may comprise at least one of a configuration for the first UE to perform beam measurements of the first direct link, an indication of one or more beams for use by the first UE after activation of the first direct link, an allocation of grant resources for the first UE, instructions for the first UE to transmit a signal to the base station indicating that the first UE is ready to resume communication on the first direct link, or an indication of timing of the activation of the first direct link. In some aspects, the first UE may measure a plurality of direct link beams and select a direct link beam from the plurality of direct link beams having a highest signal quality.

In some aspects, activation of the first direct link may be based on reception of the activation signal. For example, the first UE may activate the first direct link upon reception of the activation signal or after a fixed time after the reception of the activation signal. In some aspects, the first UE may activate the first direct link upon transmission of an acknowledgement of the reception of the activation signal. In some aspects, the UE may activate the first direct link after a period of time after reception of the activation signal in which the first UE is ready to resume control and data communication on the first direct link, based on the capability of the first UE. In some aspects, the first UE may activate the first direct link upon completion of first direct link beam measurements and selects the best beam, based at least on signal strength, from a plurality of candidate beams. In such instances, the first UE may report the measurements and may obtain the signaling for the beam to use on the first direct link. In some aspects, the first UE may activate the first direct link upon performing beam measurements and a random access channel (RACH) procedure on the selected beam on the first direct link. In some aspects, the first UE may notify the base station that activation of the first direct link is complete and request resources. In some aspects, if the beam selected or identified for use for the first direct link is available and/or updated at the time activation signaling is received, the first UE may transmit the scheduling request on the direct link, wherein request resources and/or notification to the base station that activation is complete. The first UE may utilize the granted resources to transmit data, CSI report, L1 measurements, buffer status report, or power headroom report.

The activation signal may comprise L1 or L2 signaling. The L1 or L2 signaling may comprise information related to the first direct link. For example, the L1 or L2 signaling may comprise at least one or reference signal information to perform beam measurements, one or more beams to use after the activation of the direct beam, grant resources to use (e.g., dynamic grant or configured grant semi-persistent scheduling), scheduling request resources where the first UE transmits the SR to notify the base station that the first UE is ready to resume data and/or control operations on the first direct link, or a time to trigger (e.g., when the activation of the direct link occurs). In some aspects, the timer to trigger activation of the first direct link may be implicit or explicit. For example, an implicit time to trigger activation may be based on a specific number of subframes or time period upon reception of the activation message or transmission of the acknowledgement of the reception of the activation message. The specific number of subframes or time period may be configured by RRC, may be a predetermined setting, or may be based on the capability supported by the UE. An explicit time to trigger activation may be specified in the activation signaling.

Figure 12:
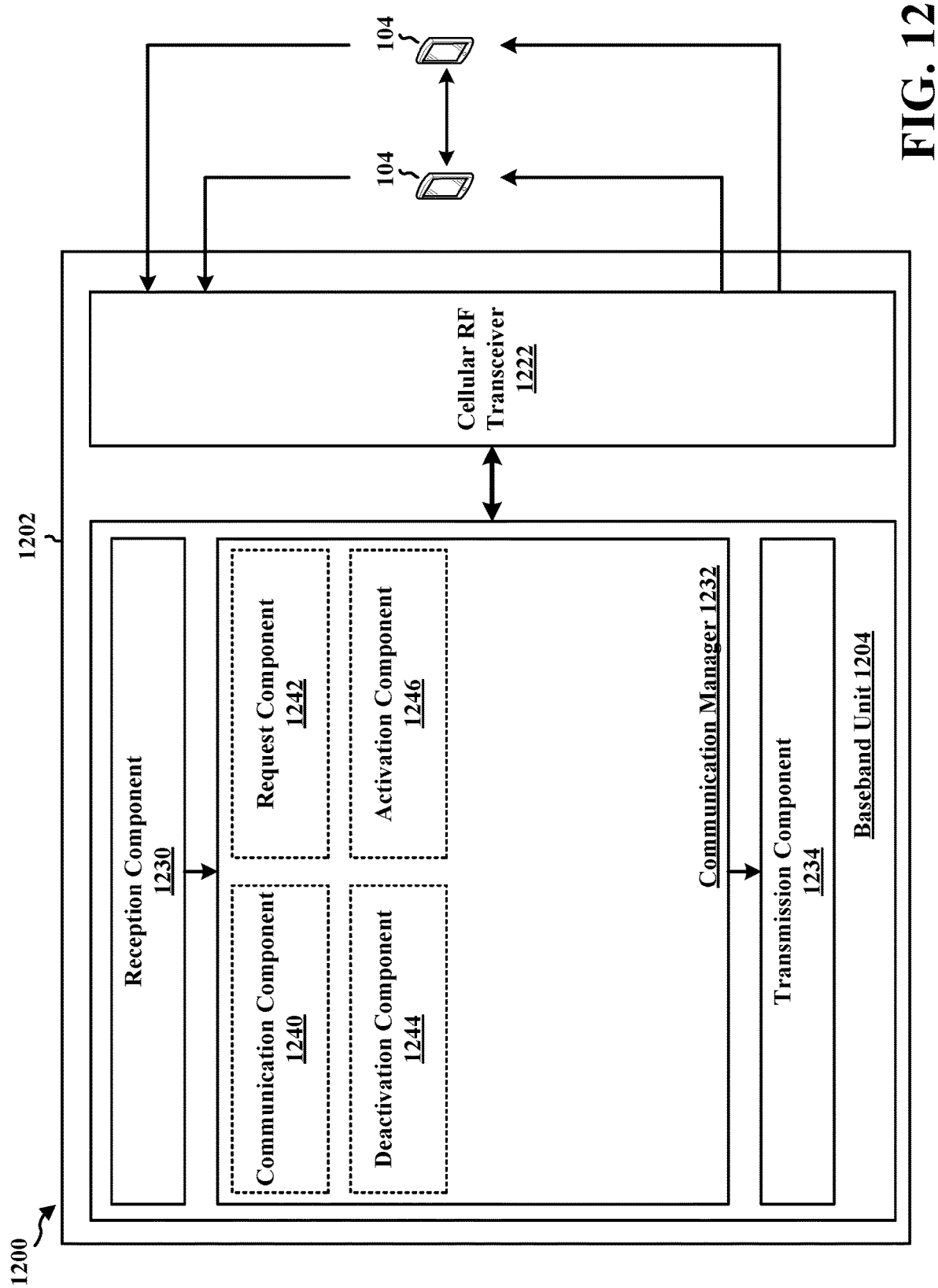
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a communication component 1240 that may communicate with a first UE using a first direct link and using a relay link, e.g., as described in connection with 1102 of FIG. 11. The communication manager 1232 further includes a request component 1242 that may transmit or receive a request to deactivate the first direct link, e.g., as described in connection with 1104 of FIG. 11. The request component 1242 may be configured to receive, from the first UE or the second UE, the request to deactivate the first direct link, e.g., as described in connection with 1106 of FIG. 11. The request component 1242 may be configured to transmit, to the first UE or the second UE, the request to deactivate the first direct link, e.g., as described in connection with 1108 of FIG. 11. The request component 1242 may be configured to transmit or receive a signal to request activation of the first direct link, e.g., as described in connection with 1112 of FIG. 11. The request component 1242 may be configured to transmit, to the second UE, the signal to request activation of the first direct link, e.g., as described in connection with 1114 of FIG. 11. The request component 1242 may be configured to receive, from the second UE, the signal to request activation of the first direct link, e.g., as described in connection with 1116 of FIG. 11. The communication manager 1232 further includes a deactivation component 1244 that may transmit a deactivation command to deactivate the first direct link, e.g., as described in connection with 1110 of FIG. 11. The communication manager 1232 further includes an activation component 1246 that may transmit, to the second UE, an activation signal to activate the first direct link, e.g., as described in connection with 1118 of FIG. 11.

The apparatus may include additional components that perform each of the blocks of the algorithm in the aforementioned flowchart of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for communicating with a first UE using a first direct link and using a relay link. The relay link comprises a sidelink between the first UE and a second UE and a second direct link between the second UE and the base station. The apparatus includes means for transmitting or receiving a request to deactivate the first direct link, based on a determination by at least one of the base station, the first UE, or the second UE that the first direct link is to be deactivated. The request to deactivate the first direct link comprises L1 or L2 signaling. The apparatus includes means for transmitting a deactivation command to deactivate the first direct link. The means for transmitting or receiving the request to deactivate the first direct link is configured to receive, from the first UE or the second UE, the request to deactivate the first direct link. The request to deactivate the first direct link is received from the first UE using the first direct link or is received from the second UE using the relay link. The means for transmitting or receiving the request to deactivate the first direct link is configured to transmit, to the first UE or the second UE, the request to deactivate the first direct link. The request to deactivate the first direct link is transmitted to the first UE using the first direct link or the relay link. The apparatus further includes means for transmitting or receiving a signal to request activation of the first direct link. The apparatus further includes means for transmitting, to the second UE, an activation signal to activate the first direct link. The second UE relays the activation signal from the base station to the first UE. The means for transmitting or receiving the signal to request activation of the first direct link configured to transmitting the signal to request activation of the first direct link to the second UE. The second UE relays the signal to request activation of the direct link to the first UE. The means for transmitting or receiving the signal to request activation of the first direct link configured to receive the signal to request activation of the first direct link from the second UE. The second UE relays the signal to request activation from the first UE to the base station or the second UE initiates transmission of the signal to request activation. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a first UE comprising communicating with a base station using a direct link and using a relay link, wherein the relay link comprises a sidelink between the first UE and a second UE and a second direct link between the second UE and the base station; transmitting or receiving a request to deactivate the direct link based on a determination by at least one of the base station, the first UE, or the second UE that the direct link between the first UE and the base station is to be deactivated, wherein the request to deactivate the direct link comprises L1 or L2 signaling; and receiving a deactivation command to deactivate the direct link.

In Aspect 2, the method of Aspect 1 further includes that the transmitting or receiving the request to deactivate the direct link further includes transmitting, to the base station, the request to deactivate the direct link using the direct link or the relay link, wherein the first UE transmits the request to deactivate the direct link using the direct link, wherein the second UE relays the request to deactivate the direct link from the first UE to the base station using the relay link.

In Aspect 3, the method of Aspect 1 or 2 further includes that the transmitting or receiving the request to deactivate the direct link further includes receiving, from the base station or the second UE, the request to deactivate the direct link using the direct link or the relay link, wherein the request to deactivate the direct link is received from the base station using the direct link, wherein the request to deactivate the direct link is received from the second UE, wherein the second UE relays the request from the base station to the first UE using the relay link.

In Aspect 4, the method of any of Aspects 1-3 further includes that the transmitting or receiving the request to deactivate the direct link further includes transmitting, to the second UE, the request to deactivate the direct link using the relay link, wherein the second UE comprises at least one relay UE and relays the request from the first UE to the base station using the second direct link.

In Aspect 5, the method of any of Aspects 1-4 further includes that the receiving the deactivation command to deactivate the direct link further includes receiving, from the base station, the deactivation command to deactivate the direct link, wherein the deactivation command comprises L1 or L2 signaling.

In Aspect 6, the method of any of Aspects 1-5 further includes that the receiving the deactivation command to deactivate the direct link further includes receiving, from the second UE, the deactivation command to deactivate the direct link, wherein the second UE comprises at least one relay UE and relays the deactivation command from the base station to the first UE using the relay link.

In Aspect 7, the method of any of Aspects 1-6 further includes that the direct link between the first UE and the base station is determined to be deactivated based on at least one of a reduction of quality of service of the direct link, a signal quality of the direct link falling below a threshold, the relay link providing requested service requirements, or a power savings requirement at the first UE.

In Aspect 8, the method of any of Aspects 1-7 further includes transmitting or receiving a signal to request activation of the direct link between the first UE and the base station; and receiving, from the second UE, an activation signal to activate the direct link, wherein the second UE relays the activation signal from the base station to the first UE using the relay link.

In Aspect 9, the method of any of Aspects 1-8 further includes that the transmitting or receiving the signal to request activation of the direct link further includes receiving, from the second UE, the signal to request activation of the direct link, wherein the second UE relays the signal to request activation of the direct link from the base station to the first UE using the relay link.

In Aspect 10, the method of any of Aspects 1-9 further includes that the transmitting or receiving the signal to request activation of the direct link further includes transmitting, to the second UE, the signal to request activation of the direct link, wherein the second UE relays the signal to request activation of the direct link from the first UE to the base station using the relay link.

In Aspect 11, the method of any of Aspects 1-10 further includes that a time to trigger activation of the direct link is based at least on a preconfigured number of subframes, reception of the activation signal, or transmission of an acknowledgement in response to the reception of the activation signal.

In Aspect 12, the method of any of Aspects 1-11 further includes that the activation signal comprises at least one of a configuration for the first UE to perform beam measurements of the direct link, an indication of one or more beams for use by the first UE after activation of the direct link, an allocation of grant resources for the first UE, instructions for the first UE to transmit a signal to the base station indicating that the first UE is ready to resume communication on the direct link, or an indication of timing of the activation of the direct link.

In Aspect 13, the method of any of Aspects 1-12 further includes that activation of the direct link is based on reception of the activation signal or transmission of an acknowledgement, by the first UE, of the activation signal to the base station.

Aspect 14 is a device including one or more processors and one or more memories in electronic communication with the one or more processors and storing instructions executable by the one or more processors to cause the device to implement a method as in any of Aspects 1-13.

Aspect 15 is a system or apparatus including means for implementing a method or realizing an apparatus as in any of Aspects 1-13.

Aspect 16 is a non-transitory computer readable storage medium storing instructions executable by one or more processors to cause the one or more processors to implement a method as in any of Aspect 1-13.

Aspect 17 is a method of wireless communication at a second UE comprising communicating with a base station using a second direct link and a first UE using a relay link, wherein the relay link comprises a sidelink between the first UE and the second UE and the second direct link between the second UE and the base station; receiving a request to deactivate a first direct link between the first UE and the base station, wherein the request to deactivate the first direct link comprises L1 or L2 signaling; relaying, to the first UE or the base station, the request to deactivate the first direct link between the base station and the first UE; and relaying, to the first UE, a deactivation command to deactivate the first direct link.

In Aspect 18, the method of Aspect 17 further includes that the receiving the request to deactivate the first direct link further includes receiving, from the first UE, the request to deactivate the first direct link, wherein the second UE relays the request to deactivate the first direct link to the base station.

In Aspect 19, the method of Aspect 17 or 18 further includes that the receiving the request to deactivate the first direct link further includes receiving, from the base station, the request to deactivate the first direct link, wherein the second UE relays the request to deactivate the first direct link to the first UE.

In Aspect 20, the method of any of Aspects 17-19 further includes that the deactivation command is received from the base station using the second direct link and is relayed to the first UE using the sidelink, wherein the deactivation command comprises L1 or L2 signaling.

In Aspect 21, the method of any of Aspects 17-20 further includes that the request to deactivate the first direct link is based on at least one of a reduction of quality of service of the first direct link, a signal quality of the first direct link falling below a threshold, the relay link providing requested service requirements, or power savings requirement at the first UE.

In Aspect 22, the method of any of Aspects 17-21 further includes receiving a signal to request activation of the first direct link between the first UE and the base station; receiving, from the base station, an activation signal to activate the first direct link; and relaying, to the first UE, the activation signal from the base station to the first UE.

In Aspect 23, the method of any of Aspects 17-22 further includes that the signal to request activation of the first direct link is received from the base station using the second direct link, wherein the signal to request activation of the first direct link is relayed to the first UE using the relay link.

In Aspect 24, the method of any of Aspects 17-23 further includes that the signal to request activation of the first direct link is received from the first UE, wherein the signal to request activation of the first direct link is relayed to the base station using the relay link.

In Aspect 25, the method of any of Aspects 17-24 further includes that the activation signal comprises at least one of a configuration for the first UE to perform beam measurements of the first direct link, an indication of one or more beams for use by the first UE after activation of the first direct link, an allocation of grant resources for the first UE, instructions for the first UE to transmit a signal to the base station indicating that the first UE is ready to resume communication on the first direct link, or an indication of timing of the activation of the first direct link.

Aspect 26 is a device including one or more processors and one or more memories in electronic communication with the one or more processors and storing instructions executable by the one or more processors to cause the device to implement a method as in any of Aspects 17-25.

Aspect 27 is a system or apparatus including means for implementing a method or realizing an apparatus as in any of Aspects 17-25.

Aspect 28 is a non-transitory computer readable storage medium storing instructions executable by one or more processors to cause the one or more processors to implement a method as in any of Aspect 17-25.

Aspect 29 is a method of wireless communication at a base station comprising communicating with a first UE using a first direct link and using a relay link, wherein the relay link comprises a sidelink between the first UE and a second UE and a second direct link between the second UE and the base station; transmitting or receiving a request to deactivate the first direct link, based on a determination by at least one of the base station, the first UE, or the second UE that the first direct link is to be deactivated, wherein the request to deactivate the first direct link comprises L1 or L2 signaling; and transmitting a deactivation command to deactivate the first direct link.

In Aspect 30, the method of Aspect 29 further includes that the transmitting or receiving the request to deactivate the first direct link further includes receiving, from the first UE or the second UE, the request to deactivate the first direct link, wherein the request to deactivate the first direct link is received from the first UE using the first direct link or is received from the second UE using the relay link.

In Aspect 31, the method of Aspect 29 or 30 further includes that the transmitting or receiving the request to deactivate the first direct link further includes transmitting, to the first UE or the second UE, the request to deactivate the first direct link, wherein the request to deactivate the first direct link is transmitted to the first UE using the first direct link or the relay link.

In Aspect 32, the method of any of Aspects 29-31 further includes that the deactivation command comprises L1 or L2 signaling and is transmitted to the first UE or the second UE, wherein the deactivation command is transmitted to the first UE using the first direct link, wherein the deactivation command is transmitted to the second UE and is relayed to the first UE, by the second UE, using the relay link, wherein the second UE comprises at least one relay UE that relays the deactivation command to the first UE.

In Aspect 33, the method of any of Aspects 29-32 further includes transmitting or receiving a signal to request activation of the first direct link; and transmitting, to the second UE, an activation signal to activate the first direct link, wherein the second UE relays the activation signal from the base station to the first UE.

In Aspect 34, the method of any of Aspects 29-33 further includes that the transmitting or receiving the signal to request activation of the first direct link further includes transmitting the signal to request activation of the first direct link to the second UE, wherein the second UE relays the signal to request activation of the direct link to the first UE.

In Aspect 35, the method of any of Aspects 29-34 further includes that the transmitting or receiving the signal to request activation of the first direct link further includes receiving the signal to request activation of the first direct link from the second UE, wherein the second UE relays the signal to request activation from the first UE to the base station or the second UE initiates transmission of the signal to request activation.

Aspect 36 is a device including one or more processors and one or more memories in electronic communication with the one or more processors and storing instructions executable by the one or more processors to cause the device to implement a method as in any of Aspects 29-35.

Aspect 37 is a system or apparatus including means for implementing a method or realizing an apparatus as in any of Aspects 29-35.

Aspect 38 is a non-transitory computer readable storage medium storing instructions executable by one or more processors to cause the one or more processors to implement a method as in any of Aspect 29-35.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first user equipment (UE), comprising:
   a memory; and
   at least one processor coupled to the memory and configured to:
   receive an activation signal to activate a direct link, the activation signal comprising a direct link configuration related to a beam configuration for activation of the direct link;
   communicate with a base station using the direct link and using a relay link, wherein the relay link comprises a sidelink between the first UE and a second UE and a second direct link between the second UE and the base station;
   transmit or receive a request to deactivate the direct link, based on a determination by at least one of the base station, the first UE, or the second UE that the direct link between the first UE and the base station is to be deactivated, wherein the request to deactivate the direct link comprises layer 1 (L1) or layer 2 (L2) signaling; and
   receive a deactivation command to deactivate the direct link.

2. The apparatus of claim 1, wherein to transmit or receive the request to deactivate the direct link the at least one processor is configured to:
   transmit, to the base station, the request to deactivate the direct link using the direct link or the relay link, wherein the first UE transmits the request to deactivate the direct link using the direct link, or wherein the second UE relays the request to deactivate the direct link from the first UE to the base station using the relay link.

3. The apparatus of claim 1, wherein to transmit or receive the request to deactivate the direct link the at least one processor is configured to:
   receive, from the base station or the second UE, the request to deactivate the direct link using the direct link or the relay link, wherein the request to deactivate the direct link is received from the base station using the direct link, or wherein the request to deactivate the direct link is received from the second UE, wherein the second UE relays the request from the base station to the first UE using the relay link.

4. The apparatus of claim 1, wherein to transmit or receive the request to deactivate the direct link the at least one processor is configured to:
   transmit, to the second UE, the request to deactivate the direct link using the relay link, wherein the second UE comprises at least one relay UE and relays the request from the first UE to the base station using the second direct link.

5. The apparatus of claim 1, wherein to receive the deactivation command to deactivate the direct link the at least one processor is configured to:
   receive, from the base station, the deactivation command to deactivate the direct link, wherein the deactivation command comprises L1 or L2 signaling.

6. The apparatus of claim 1, wherein to receive the deactivation command to deactivate the direct link the at least one processor is configured to:
receive, from the second UE, the deactivation command to deactivate the direct link, wherein the second UE comprises at least one relay UE and relays the deactivation command from the base station to the first UE using the relay link.

7. The apparatus of claim 1, wherein the direct link between the first UE and the base station is determined to be deactivated based on at least one of a reduction of quality of service of the direct link, a signal quality of the direct link falling below a threshold, the relay link providing requested service requirements, or a power savings requirement at the first UE.

8. The apparatus of claim 1, wherein the at least one processor is further configured to:
transmit or receive a signal to request activation of the direct link between the first UE and the base station; and
receive, from the second UE, the activation signal to activate the direct link, wherein the second UE relays the activation signal from the base station to the first UE using the relay link.

9. The apparatus of claim 8, wherein to transmit or receive the signal to request activation of the direct link the at least one processor is configured to:
receive, from the second UE, the signal to request activation of the direct link, wherein the second UE relays the signal to request activation of the direct link from the base station to the first UE using the relay link.

10. The apparatus of claim 8, wherein to transmit or receive the signal to request activation of the direct link the at least one processor is configured to:
transmit, to the second UE, the signal to request activation of the direct link, wherein the second UE relays the signal to request activation of the direct link from the first UE to the base station using the relay link.

11. The apparatus of claim 8, wherein a time to trigger activation of the direct link is based at least on a preconfigured number of subframes, reception of the activation signal, or transmission of an acknowledgement in response to the reception of the activation signal.

12. The apparatus of claim 8, wherein the activation signal comprises at least one of a configuration for the first UE to perform beam measurements of the direct link, an indication of one or more beams for use by the first UE after activation of the direct link, an allocation of grant resources for the first UE, instructions for the first UE to transmit a signal to the base station indicating that the first UE is ready to resume communication on the direct link, or an indication of timing of the activation of the direct link.

13. The apparatus of claim 8, wherein activation of the direct link is based on reception of the activation signal or transmission of an acknowledgement, by the first UE, of the activation signal to the base station.

14. An apparatus for wireless communication at a second user equipment (UE), comprising:
a memory; and
at least one processor coupled to the memory and configured to:
receive an activation signal to activate a first direct link, the activation signal comprising a direct link configuration related to a beam configuration for activation of the first direct link;
communicate with a base station using a second direct link and a first UE using a relay link, wherein the relay link comprises a sidelink between the first UE and the second UE and the second direct link between the second UE and the base station;
receive a request to deactivate the first direct link between the first UE and the base station, wherein the request to deactivate the first direct link comprises layer 1 (L1) or layer 2 (L2) signaling;
relay, to the first UE or the base station, the request to deactivate the first direct link between the base station and the first UE; and
relay, to the first UE, a deactivation command to deactivate the first direct link.

15. The apparatus of claim 14, wherein to receive the request to deactivate the first direct link the at least one processor is configured to:
receive, from the first UE, the request to deactivate the first direct link, wherein the second UE relays the request to deactivate the first direct link to the base station.

16. The apparatus of claim 14, wherein to receive the request to deactivate the first direct link the at least one processor is configured to:
receive, from the base station, the request to deactivate the first direct link, wherein the second UE relays the request to deactivate the first direct link to the first UE.

17. The apparatus of claim 14, wherein the deactivation command is received from the base station using the second direct link and is relayed to the first UE using the sidelink, wherein the deactivation command comprises L1 or L2 signaling.

18. The apparatus of claim 14, wherein the request to deactivate the first direct link is based on at least one of a reduction of quality of service of the first direct link, a signal quality of the first direct link falling below a threshold, the relay link providing requested service requirements, or power savings requirement at the first UE.

19. The apparatus of claim 14, wherein the at least one processor is further configured to:
receive a signal to request activation of the first direct link between the first UE and the base station;
receive, from the base station, the activation signal to activate the first direct link; and
relay, to the first UE, the activation signal from the base station to the first UE.

20. The apparatus of claim 19, wherein the signal to request activation of the first direct link is received from the base station using the second direct link, wherein the signal to request activation of the first direct link is relayed to the first UE using the relay link.

21. The apparatus of claim 19, wherein the signal to request activation of the first direct link is received from the first UE, wherein the signal to request activation of the first direct link is relayed to the base station using the relay link.

22. The apparatus of claim 19, wherein the activation signal comprises at least one of a configuration for the first UE to perform beam measurements of the first direct link, an indication of one or more beams for use by the first UE after activation of the first direct link, an allocation of grant resources for the first UE, instructions for the first UE to transmit a signal to the base station indicating that the first UE is ready to resume communication on the first direct link, or an indication of timing of the activation of the first direct link.

23. An apparatus for wireless communication at a base station, comprising:
a memory; and at least one processor coupled to the memory and configured to:
- transmit an activation signal to activate a first direct link, the activation signal comprising a direct link configuration related to a beam configuration for activation of the first direct link;
- communicate with a first user equipment (UE) using the first direct link and using a relay link, wherein the relay link comprises a sidelink between the first UE and a second UE and a second direct link between the second UE and the base station;
- transmit or receive a request to deactivate the first direct link, based on a determination by at least one of the base station, the first UE, or the second UE that the first direct link is to be deactivated, wherein the request to deactivate the first direct link comprises layer 1 (L1) or layer 2 (L2) signaling; and
- transmit a deactivation command to deactivate the first direct link.

24. The apparatus of claim 23, wherein to transmit or receive the request to deactivate the first direct link the at least one processor is configured to:
- receive, from the first UE or the second UE, the request to deactivate the first direct link, wherein the request to deactivate the first direct link is received from the first UE using the first direct link or is received from the second UE using the relay link.

25. The apparatus of claim 23, wherein to transmit or receive the request to deactivate the first direct link the at least one processor is configured to:
- transmit, to the first UE or the second UE, the request to deactivate the first direct link, wherein the request to deactivate the first direct link is transmitted to the first UE using the first direct link or the relay link.

26. The apparatus of claim 23, wherein the deactivation command comprises L1 or L2 signaling and is transmitted to the first UE or the second UE, wherein the deactivation command is transmitted to the first UE using the first direct link, wherein the deactivation command is transmitted to the second UE and is relayed to the first UE, by the second UE, using the relay link, wherein the second UE comprises at least one relay UE that relays the deactivation command to the first UE.

27. The apparatus of claim 23, wherein the at least one processor is further configured to:
- transmit or receive a signal to request activation of the first direct link; and
- transmit, to the second UE, the activation signal to activate the first direct link, wherein the second UE relays the activation signal from the base station to the first UE.

28. The apparatus of claim 27, wherein to transmit or receive the signal to request activation of the first direct link the at least one processor is configured to:
- transmit the signal to request activation of the first direct link to the second UE, wherein the second UE relays the signal to request activation of the direct link to the first UE.

29. The apparatus of claim 27, wherein to transmit or receive the signal to request activation of the first direct link the at least one processor is configured to:
- receive the signal to request activation of the first direct link from the second UE, wherein the second UE relays the signal to request activation from the first UE to the base station or the second UE initiates transmission of the signal to request activation.

30. A method of wireless communication at a first user equipment (UE), comprising:
- receiving an activation signal to activate a direct link, the activation signal comprising a direct link configuration related to a beam configuration for activation of the direct link;
- communicating with a base station using the direct link and using a relay link, wherein the relay link comprises a sidelink between the first UE and a second UE and a second direct link between the second UE and the base station;
- transmitting or receiving a request to deactivate the direct link based on a determination by at least one of the base station, the first UE, or the second UE that the direct link between the first UE and the base station is to be deactivated, wherein the request to deactivate the direct link comprises layer 1 (L1) or layer 2 (L2) signaling; and
- receiving a deactivation command to deactivate the direct link.

* * * * *